US007620404B2

(12) United States Patent
Chesnais et al.

(10) Patent No.: US 7,620,404 B2
(45) Date of Patent: Nov. 17, 2009

(54) METHODS AND APPARATUS FOR ORGANIZING AND PRESENTING CONTACT INFORMATION IN A MOBILE COMMUNICATION SYSTEM

(76) Inventors: Pascal Chesnais, 152 New Bridge Rd., Sudbury, MA (US) 01776; Sean Wheeler, 26 Harley St., Apt. 1, Boston, MA (US) 02124; Steven Pomeroy, 41 Edge Hill Rd., Chestnut Hill, MA (US) 02467

( * ) Notice: Subject to any disclaimer, the term of this patent is extended or adjusted under 35 U.S.C. 154(b) by 476 days.

(21) Appl. No.: 11/317,473

(22) Filed: Dec. 22, 2005

(65) Prior Publication Data

US 2007/0150444 A1 Jun. 28, 2007

(51) Int. Cl.
*H04Q 7/20* (2006.01)
(52) U.S. Cl. .................. 455/456.1; 455/440; 455/414.2; 455/456.3
(58) Field of Classification Search .............. 455/414.1, 455/400, 466, 567, 414.2, 456.1, 456.3, 456.5, 455/422.1, 560, 418, 457; 709/227, 201, 709/253, 206
See application file for complete search history.

(56) References Cited

U.S. PATENT DOCUMENTS

| 6,362,778 | B2 | 3/2002 | Neher |
| 6,819,919 | B1 * | 11/2004 | Tanaka ..................... 455/414.1 |
| 6,950,649 | B2 | 9/2005 | Videtich |
| 6,968,052 | B2 | 11/2005 | Wullert, II |
| 6,973,299 | B2 * | 12/2005 | Apfel ...................... 455/412.2 |
| 7,424,541 | B2 * | 9/2008 | Bourne ....................... 709/227 |
| 2002/0067308 | A1 | 6/2002 | Robertson |
| 2004/0017376 | A1 | 1/2004 | Tagliabue et al. |
| 2004/0067773 | A1 * | 4/2004 | Rachabathuni et al. ....... 455/560 |
| 2005/0073443 | A1 | 4/2005 | Sheha et al. |
| 2005/0143096 | A1 | 6/2005 | Boesch |
| 2005/0143909 | A1 | 6/2005 | Orwant |
| 2005/0233776 | A1 | 10/2005 | Allen et al. |
| 2006/0010395 | A1 * | 1/2006 | Aaltonen ..................... 715/779 |
| 2006/0148532 | A1 * | 7/2006 | Schnurr ...................... 455/567 |
| 2006/0150119 | A1 | 7/2006 | Chesnais |

* cited by examiner

*Primary Examiner*—Tan Trinh
(74) *Attorney, Agent, or Firm*—Gazdinski & Associates, PC

(57) ABSTRACT

Methods and apparatus for gathering, organizing and displaying contact information in a mobile communications network. In one embodiment, a method for operating a mobile communication network includes an information server and a mobile communications device coupled to the service via a wireless connection. The method comprises transmitting a location identifier message including a current location from the mobile communications device to the server via the wireless link. The mobile device also transmits a list of contacts to the server via the wireless link. The contacts are matched with the location using a location database maintained for other mobile communications devices in order to generate a list of proximate users. Alternatively, the contact list can be based upon cognitive or psychographic proximity (versus merely physical proximity). The list of proximate users is transmitted to the mobile communications device, and the list is displayed in an easily perceived fashion based on user preferences.

28 Claims, 13 Drawing Sheets

METHODS AND APPARATUS FOR ORGANIZING AND PRESENTING CONTACT INFORMATION IN A MOBILE COMMUNICATION SYSTEM

RELATED APPLICATIONS

This application is related to co-pending U.S. patent application Ser. No. 11/026,421 filed Jan. 31, 2004 entitled "Method for interacting with automated information agents using conversational queries", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention The present invention is related to the field of mobile communications. More particularly, the present invention is directed to a method and apparatus for gathering, organizing and displaying contact information in a mobile communications device and associated network.

2. Description of Related Technology

Mobile communications devices such as cellular telephones, smartphones and personal information managers (PIMs) such as the Blackberry device manufactured by RIM typically store contact information including name, address, short message service (SMS) information, e-mail, chat ID and one or more telephone numbers. Users of the mobile devices can view the contact information via a display screen integrated into the device. These contacts may also be stored and used on a per-user basis; i.e., different users of the same device may have their own personalized contact lists.

Prior art approaches to contact management by the mobile device user include listing contacts in alphabetical order based on name. These often resemble a "rolodex" or similar device, in order to provide the user a recognizable frame of reference. The managed contacts may also be listed in the order in which they were last contacted, or even other schemes (e.g., priority or frequency or duration of use). To initiate a communications session such as a telephone call or PoC (push-to-talk over cellular) session, the user may select one of the contacts using an input device such as a keypad or input wheel.

Due to recent technological advances, many mobile communications devices now have the ability to determine their location. Position location may be performed by triangulation with one or more cell sites or the use of a satellite based position location service such as the "Global Positioning Service" (GPS). Other types of technological advances, such as the ability to create ad hoc networks or device pairings using, e.g., WiFi (IEEE Std. 802.11) or Bluetooth devices, provides yet further information that may be useful in determining location.

A variety of different approaches to mobile device location and contact management/interaction are present in the prior art. For example, U.S. Pat. No. 6,362,778 to Neher issued on Mar. 26, 2002 and entitled "Personal location detection system" discloses a personal locator system for determining the location of a locator unit. The system includes a locator device in communication with both a central station and a GPS satellite. A communication system is positioned within the housing for contacting the central station and includes a transmitter and receiver. A GPS unit is also positioned within the housing for contacting the GPS system for determining a location of said locator device. Upon receipt of a location request signal by the receiver from the central station, the locator unit activates the GPS unit to contact the GPS system and receive location data therefrom. Upon receipt of the location data, the transmitter transmits the location data to the central station for analysis.

U.S. Pat. No. 6,819,919 to Tanaka issued on Nov. 16, 2004 and entitled "Method for providing matching and introduction services to proximate mobile users and service providers" discloses a system enabling mobile wireless users to obtain information on other proximate users both fixed and wireless. The information is gathered from a central database that stores user profiles and real-time locations of system users. Mobile users can request information on nearby users by submitting a request from a mobile telephone or similar communications endpoint to the central database. The request is accompanied by the user's location, obtained from GPS (Global Positioning System) or other technology, or from user input. The server searches the profile database for nearby users based on requester's location, locations of other users of the system and optional parameters specified in the request. Search results are returned to the requester. The system facilitates communication between requester and owner(s) of profiles returned by system.

U.S. Pat. No. 6,950,649 to Videtich issued on Sep. 27, 2005 and entitled "Method and system for pulling information from a mobile vehicle within a mobile vehicle communications system" discloses a system and method that is directed to obtaining information from a mobile vehicle within a mobile vehicle communication service. The method provides creating a mobile vehicle contact list based on an information request, determining a time period to transmit the mobile vehicle contact list and the information request, transmitting the mobile vehicle contact list and the information request to the mobile vehicle at the determined time period, and receiving the information from the mobile vehicle, at a specified time, based on the information requested. The system further provides means for creating a vehicle contact list based on the information request, means for determining a time period to transmit the mobile vehicle contact list and the information request, means for transmitting the mobile vehicle contact list and the information request to the mobile vehicle at the determined time period, and means for receiving the information, at a specified time, from the mobile vehicle based on the information requested.

U.S. Pat. No. 6,968,052 to Wullert, II issued on Nov. 22, 2005 and entitled "Method and apparatus for creating a presence monitoring contact list with dynamic membership" discloses methods and apparatus to generate a dynamic contact list of contact and presence information about contact events in a communication system when a calling entity unsuccessfully attempts to communicate with a called entity. When such a contact event occurs, a routing processor or call agent generates contact information about the contact event, including the calling party, called party, time of the contact event, and purpose of the contact event. A presence management processor also generates the presence information about the calling party's subsequent availability for return communication, including if a calling party is available for return communication, when the calling party is available for return communication, how long the calling party is available for return communication, and how the calling party is available for return communication. This contact and presence information is displayed to the called party in a dynamic contact list that includes contact and presence information for a plurality of contact events and calling parties, respectively.

U.S. Pat. No. 6,973,299 to Apfel issued on Dec. 6, 2005 and entitled "Unified contact list" discloses methods, systems, and computer program products for maintaining current contact and metadata information for one or more contacts. A mobile phone stores contact information for multiple forms of mobile phone communication with the contacts. Each contact is identified as either an automatic live contact to be synchronized as new information becomes available or as another contact that will not be synchronized as new information becomes available. The mobile phone communicates the contacts to a data service provider for backup storage and update processing. From automatic contact and metadata information updates initiated by and received from the data service provider the mobile phone periodically updates automatic live contacts. Based on the synchronized contact and metadata information, the mobile phone initiates communication with one of the contacts. Example communication includes voice, email, instant messaging, short message service, multimedia message service, locate, and peer to peer application (such as gaming) communication.

United States Patent Publication No. 20020067308 to Robertson published on Jun. 6, 2002 and entitled "Location/time-based reminder for personal electronic devices" discloses a system and method which combines a positioning system, for example, the Navistar global positioning system (GPS), with a personal electronic device. The personal electronic device can be a PDA, or a mobile cellular phone, for example. The positioning system provides real-time location specific information that is converted into coordinates, such as latitude and longitude. The system and method of the present invention then references the location to a particular task stored in resident memory and activates a reminder which notifies the user of a particular task. This involves having the user input reminders which signal when the user is within a specified geographic area, or within a specified range which is in the resolution of the GPS.

United States Patent Publication No. 20040017376 to Tagliabue et al. published on Jan. 29, 2004 and entitled "Graphic entries for interactive directory", incorporated herein by reference in its entirety, discloses an apparatus and method for a communication device having a display for graphically organizing communication patterns of the user. Visual attributes of the images associated with specific parties are varied dynamically as the communication patterns of the user with specific parties change. For example, users are represented by pictures, which grow and shrink according to, e.g., frequency of communication.

United States Patent Publication No. 20050073443 to Sheha, et al. published on Apr. 7, 2005 and entitled "Method and system for saving and retrieving spatial related information" discloses a method and apparatus for storing, referencing, retrieving, and graphically displaying spatial and non-spatial related information of a mobile computing device, such as a laptop computer or a cellular telephone. The spatial-related information may be obtained by using positioning tracking systems such as a global positioning system, whereas the non-spatial related information may include communication activities associated with the mobile computing device, such as phone calls, e-mails, text messages, pages, etc. The present invention also provides methods and apparatus of summarizing the spatial and non-spatial related information for more effective and intuitive display of the information to the user, including the use of graphical map and calendar of events. Finally, the present invention provides methods and apparatus for sharing the spatial and non-spatial related information with other users, and for planning routes of travel using the spatial and non-spatial related information.

United States Patent Publication No. 20050143096 to Boesch published Jun. 30, 2005 and entitled "System and method for establishing and monitoring the relative location of group members" discloses systems and methods for monitoring a perimeter for ingress or egress by a member of an ad hoc wireless network. A wireless device is equipped with location means. In an embodiment, the wireless device is a cellular telephone equipped with a GPS chip set. A plurality of such wireless devices form an ad hoc network and are linked to a server in association with each other. The server receives retains perimeter boundary data and receives positioning information from each of the plurality of associated wireless devices. The locations of each member of a network are tracked relative to perimeter. A perimeter may be an egress perimeter, which defines an area in which monitored units are permitted to roam but from which network members may not leave. A perimeter may be an ingress perimeter, which defines an area in which monitored units are not permitted to enter. An ingress perimeter may reside within an egress perimeter. The system provides warnings when a perimeter boundary is approached or crossed.

United States Patent Publication No. 20050233776 to Allen et al. published on Oct. 20, 2005 and entitled "Method and apparatus for dynamic group address creation" discloses a method and apparatus for creating and maintaining dynamic group addresses for facilitating Push-to-Talk over Cellular (PoC) group communication sessions among mobile stations in a communications network are disclosed. In one embodiment the method comprises receiving at least one rule defining a member of the dynamic group in association with a group address; and populating the dynamic group with members from said mobile stations determined in accordance with the at least one rule. Rules may be defined with reference to presence and/or location information available for the mobile stations. Such information may be published on behalf of the stations to one or more servers adapted to identify mobile stations matching the rules. The method may comprise subscribing to the servers to obtain the matching mobile stations with which to populate dynamic group addresses.

"Friend contact" services are also known in the prior art. For example, the service provided by Dodgeball.com (Google Inc.) allows users to contact their friend via text messaging; users enter their friend or "buddy" lists, and then send a communication to the server indicating their present location. The service then sends out messages to the persons listed on the user's list, thereby notifying them of the user's present location. This service, however, suffers from several disabilities including the inability of a user to know the locations of his/her friends, family, buddies, etc. Rather, the Dodgeball approach merely broadcasts information, and the user regarding which the information was broadcast really has no information as to the status or location of the persons on his/her list that are receiving the messages. It also suffers from requiring too much user manual entry, which can become very tedious, especially in the case of larger contact lists.

The aforementioned contact management schemes are lacking, however, in their ability to leverage the dynamically varying situation of the mobile user. This variability may reflect itself in the changing position or location of the user, the changing situation or context of the user (e.g., work versus school versus home versus traveling, etc.), and the changing needs of a user within a particular context (e.g., the need to access different types of contacts based on current situation, even within the same context or venue). The "rolodex" paradigm previously described is especially lacking, in that it has no real mechanism to capture this type of variability. For example a typical rolodex function can simply be updated with new information, yet there is still no connection or intelligence in the management or utilization of this information with respect to the user's present context or situation.

Prior art proximity and location determination is also very much a "point to point" determination; e.g., the user's distance from a known or fixed location. This approach is suitable where many such fixed location references are available, but is not well suited to a constantly changing mobile user environment. Furthermore, such approaches prevent significant display and scaling challenges, since one buddy or friend of the user may be close, another relatively distant, and some in-between, thereby requiring the display scaling to accommodate all three situations in an integrated display. This may cause the display to change scale, e.g., such that a small scale (large area) is represented, thereby rendering very close contacts effectively on top of one another on the display. This is essentially useless to a user, and any associated display information is almost necessarily obscured in such situations.

From a service provider perspective, the prior art is also deficient in that it essentially robs the user of many opportunities for communication or social interaction that they might otherwise take advantage of. For example, one located at a university may seek to contact one or more of their friends if they knew that these friends were geographically proximate to their present location (e.g., "let's have lunch" or "can you give me a ride"). Conversely, if the user has no information regarding the whereabouts (and status) of these friends, they may be much more hesitant to contact them. For the service provider, this translates to less calls, SMS messages, e-mails, or other transmissions made, and hence less revenue per unit time. It also translates to reduced user satisfaction and increased frustration, since the user is effectively operating in the blind and without timely and pertinent information that they might otherwise make use of. Users can feasibly call their friends, family etc. to find out where they are located or what their situation is, but this is time consuming, likely a bother to their friends, and consumes several calls on the network.

Hence, there is a salient need for improved apparatus and methods of using contact information (e.g., lists) and position location information common to many communications devices (or their infrastructure) in order to provide more powerful contact, "buddy", and location list management functions. Such improved apparatus and methods would also allow for the utilization of multiple parameters or conditions related to a user's contacts, including proximity (relative location to the user or another location or entity, or cognitive/psychographic "proximity") and presence (including user or contact status).

Such improved apparatus and methods would ideally be readily integrated into existing mobile communications platforms and infrastructure, and would allow the user to access real-time information concerning the proximity and status of other users, both in-network and associated with other networks.

Such apparatus and methods would also allow for the proximity determination to be based on locations other than that of the user, and would also account for geographic or other features which would tent to expand or contract the proximity determination from a practical perspective.

It would further permit for a useful display scale or representation which would communicate useful information to the user in a substantially automatic fashion without the user having to change display settings, scale, etc., such as via ad hoc area or display determination.

SUMMARY OF THE INVENTION

The present invention satisfies the foregoing needs by providing, inter alia, methods and apparatus for gathering, organizing and displaying contact information in a mobile communications device.

In a first aspect of the invention, a method of operating within a communications network is disclosed. In one embodiment, the network comprises a mobile device network including an information server and a mobile communications device coupled to the server via at least a wireless link, and the method comprises: transmitting a message including location information from the mobile communications device to the server via the at least wireless link; transmitting a list of contacts from the mobile communication device to the server via the at least wireless link; matching the contacts with the location information using location data maintained for other communications devices to generate a list of proximate users; transmitting the list of proximate users to the mobile communications device; and displaying at least a portion of the list of proximate users on the mobile communications device.

In one variant, the mobile communication device comprises a cellular telephone, and the at least wireless link comprises a cellular air interface selected form the group consisting of: (i) CDMA; (ii) GSM, and (iii) UMTS.

In another variant, the matching comprises: determining at least one coordinate for each contact in the list of contacts, the at least one coordinate selected from the group consisting of: (i) longitude-latitude, (ii) GPS coordinates, and (iii) UTM coordinates; computing a distance from a current location for the mobile communications device derived from the location information to the at least one coordinate; and removing contacts having a distance that that does not meet one or more screening criteria.

In another variant, one or more ad hoc networks (e.g., IEEE Std. 802.11, Bluetooth, etc.) are used as the basis of determining user location or contact proximity.

In still another variant, the method further comprises: obtaining a set of landmarks from a landmark location database, the set of landmarks being within a boundary distance the current location; assigning contacts that have not been removed via the act of removing to at least one cluster name, the at least one cluster name corresponding to a landmark obtained from the set of landmarks. The computing also comprises determining a true proximity by including a weighting factor for obstacles located between the current location and the at least one coordinate.

In another embodiment, the method comprises: transmitting a location identifier message including a current location from the mobile communications device to the server via the wireless link. This is followed by transmitting a list of contacts from the mobile communication device to the server via the wireless link as well as matching the contacts with the location using a location database. The location tracks the location of other mobile communications devices. The result of this matching is a list of physically proximate users. The list of proximate users is transmitted to the mobile communications device where the list is displayed.

In still another embodiment, the network comprises a mobile device network including an information server and a mobile communications device coupled to the server via at least a wireless link, and the method comprises: transmitting a message including proximity-related information from the mobile communications device to the server via the at least wireless link; transmitting a list of contacts from the mobile communication device to the server via the at least wireless link; matching the contacts with the proximity-related information to generate a list of cognitively or psychographically proximate users; transmitting the list of proximate users to the mobile communications device; and displaying at least a portion of the list of proximate users on the mobile communications device.

In a second aspect of the invention, a mobile communications device for communicating with a network is disclosed. In one embodiment the mobile communications device has an input device and a display device, and further comprises: a microprocessor adapted to run client software; client software configured to: (i) transmit a list of contacts from the mobile communications device to a server; (ii) receive a list of proximate users from the server; and (iii) display the list of proximate users on the mobile communications device; and position location apparatus in data communication with the microprocessor and adapted to determine the location of the mobile communications device.

In one variant, the list of proximate users comprises a list of users who are located within a prescribed distance from the mobile communications device. A3. The mobile communications device as set forth in Claim A, wherein the client software is further adapted to transmit the location of the mobile communication device to a server via a wireless link, the wireless link comprising a cellular air interface selected form the group consisting of: (i) CDMA; (ii) GSM, and (iii) UMTS.

In another variant, the distance between the mobile communications device and one of the contacts is calculated by weighting any distance across water more heavily than any distance across land.

In yet another variant, the proximate users are grouped into clusters based on their proximity to one or more landmarks, and the clusters are displayed by the device in a grid format. The clusters can also be displayed over a geographical map received from the server.

In a third aspect of the invention, server apparatus for use in a mobile communications network is disclosed. In one embodiment, the mobile communications network provides communications services to a plurality of mobile communications devices, and the server comprises: a microprocessor configured for executing software instructions; server software, running on the microprocessor, the server software comprising at least one software module adapted to: receive a location identifier message, including a current location, from a mobile communications device from the plurality of mobile communication devices; receive a list of contacts from the mobile communication device, match the contacts with the current location using a location database maintained for other mobile communications devices to generate a list of proximate users; and transmit the list of proximate users to the mobile communications device.

In one variant, the server software is further configured to: determine the coordinates for each contact in the list of contacts; compute a distance from the current location to each of the coordinates; and remove those contacts having a distance that is greater than a threshold distance.

In another variant, the server software is further adapted to determine a "true" proximity by including a weighting factor for obstacles located between the current location and the coordinates. For example, one of the obstacles comprises a body of water, and the distance across the body of water is given greater weight than a distance across land.

In yet another variant, the server software is configured to receive user preference information from a plurality of mobile communications device, and store the user preference information on a per-user or per-device basis.

In still a further variant, the server software is configured to retrieve information relating to a geographical area proximate to a mobile communications device requesting a buddy list, and transmit the information to the requesting mobile communications device.

In a fourth aspect of the invention, methods of loading a roster, and caching vCards within a mobile communications network are disclosed.

In a fifth aspect of the invention, a method of instigating spontaneous contact between the users of a mobile network is disclosed. The method comprises placing information regarding the geographic or other proximity of a user on the display of that user's mobile device, thereby allowing them to recognize the proximity of various friends, family or other contacts of interest.

In a sixth aspect of the invention, a method of utilizing multiple sources of location or related information to determine "proximity" to a network user or designated location is disclosed.

In a seventh aspect of the invention, a method of doing business by providing various premium service features to users of a mobile network is disclosed.

In an eighth aspect of the invention, an integrated circuit (IC) device embodying the contact management and location methodologies and algorithms of the invention is disclosed.

These and other features of the invention will become apparent from the following description of the invention, taken in conjunction with the accompanying drawings.

DETAILED DESCRIPTION OF THE INVENTION

Figure 1:
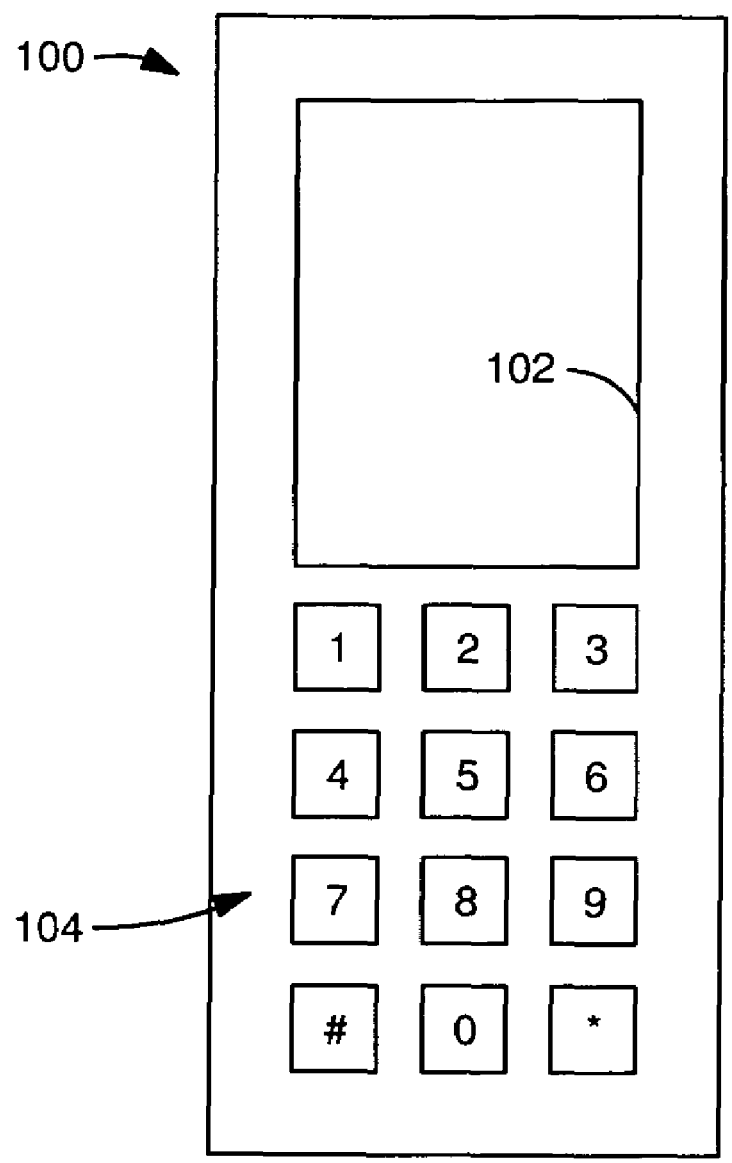
FIG. 1 is a plan view of an exemplary mobile communications device useful with the present invention.

Reference is now made to the drawings wherein like numerals refer to like parts throughout.

As used herein, the terms "network" and "bearer network" refer generally to any type of telecommunications or data network including, without limitation, wireless and Radio Area (RAN) networks, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "radio area network" or "RAN" refer generally to any wireless network including, without limitation, those complying with the 3GPP, 3GPP2, GSM, IS-95, IS-54/136, IEEE Std. 802.11, Bluetooth, WiMAX, IrdA, or PAN (e.g., IEEE Std. 802.15) standards. Such radio networks may utilize literally any air interface, including without limitation DSSS/CDMA, TDMA, FHSS, OFDM, FDMA, or any combinations or variations thereof.

As used herein, the terms "Internet" and "internet" are used interchangeably to refer to inter-networks including, without limitation, the Internet.

As used herein, the terms "client device" and "end user device" include, but are not limited to, personal computers (PCs) and minicomputers, whether desktop, laptop, or otherwise, and mobile devices such as handheld computers, PDAs, and smartphones or joint or multi-function devices (such as the Motorola ROKR music and telephony device).

As used herein, the terms "client mobile device" and "CMD" include, but are not limited to, personal digital assistants (PDAs) such as the "Palm®" family of devices, handheld computers, personal communicators such as the Motorola Accompli or MPx 220 devices, J2ME equipped devices, cellular telephones such as the Motorola A845 or ROKR, "SIP" phones such as the Motorola Ojo, personal computers (PCs) and minicomputers, whether desktop, laptop, or otherwise, or literally any other device capable of receiving video, audio or data over a network.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a client device or other device.

As used herein, the term "application" refers generally to a unit of executable software that implements a certain functionality or theme. The themes of applications vary broadly across any number of disciplines and functions (such as communications, instant messaging, content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the Java™ environment.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "server" refers to any computerized component, system or entity regardless of form which is adapted to provide data, files, applications, content, or other services to one or more other devices or entities on a computer network.

Additionally, the terms "selection" and "input" refer generally to user or other input using a keypad or other input device as is well known in the art.

As used herein, the term "speech recognition" refers to any methodology or technique by which human or other speech can be interpreted and converted to an electronic or data format or signals related thereto, including without limitation, MFCC (Mel Frequency Cepstral Coefficients) or cochlea modeling, phoneme/word recognition, HMM (hidden Markov modeling), DTW (Dynamic Time Warping) or NNs (Neural Networks).

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "integrated circuit (IC)" refers to any type of device having any level of integration (including without limitation ULSI, VLSI, and LSI) and irrespective of process or base materials (including, without limitation Si, SiGe, CMOS and GAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the term "display" means any type of device adapted to display information, including without limitation CRTs, LCDs, TFTs, plasma displays, LEDs, and fluorescent devices.

As used herein, the term "database" refers generally to one or more tangible or virtual data storage locations, which may or may not be physically co-located with each other or other system components.

As used herein, the term "image" refers to both still images and video or other types of graphical representations of visual imagery. For example, an image might comprise a JPEG file, MPEG or AVC-encoded video, or rendering in yet another format.

As used herein, the term "cellular" includes any form of cell-based mobile communications system including cellular telephones, "walkie-talkie" devices (such as those marketed by Nextel and Motorola Corporations, and so-called PTx ("push-to-anything") devices such as the exemplary PTT (push-to-talk over cellular) devices which establish and tear down SIP or other communications sessions as part of their protocol.

As used herein, the terms "coordinate(s)" refers to any method of determining, estimating or predicting the position of a device, user, or object/location. For example, coordinates for a position determination or "fix" may comprise a set of Global Positioning System (GPS) or Universal Transverse Mercator (UTM) coordinates, latitude/longitude, polar coordinates, or a triangulation via cellular base stations or wireless access points "beacons", celestial reference, or even a LORAN or similar navigation device fix. Coordinates for a position estimation ("EP") may come from other devices such as passive inertial navigation systems (e.g., Electrostatically Supported Gyroscopic Navigator or ESGN), or extrapolation from a previous fix based on speed, direction, etc. Similarly, location prediction can be accomplished according to any number of methods, such as extrapolation based on a set of input parameters (e.g., speed, direction, etc.) or "personal" tracking approaches, such as without limitation that described in United States Patent Publication No. 20050143909 to Orwant published Jun. 30, 2005 entitled "Technique for collecting and using information about the geographic position of a mobile object on the earth's surface", which is incorporated by reference herein in its entirety.

Overview

In one exemplary aspect, the present invention comprises methods and associated apparatus for providing enhanced user contact and preference management and display in a mobile communications environment.

In one embodiment, a mobile network and associated user or client devices (e.g., cellular phones, PDAs, etc.) are configured to provide each mobile user with highly relevant and timely information regarding that user's contacts, family, "buddies", and locations of interest. The invention advantageously displays this information in an easy-to-use and readily perceived format, thereby overcoming the disabilities of prior art menu-based and "rolodex" contact management systems. Multiple functions can also be invoked using this display format, such as initiating a communication channel (e.g., cellular phone call), contact status determination, and indication of physical or geographic proximity.

The aforementioned display format is also "scale agnostic" in the sense that it can accommodate contacts or clusters at a variety of different physical locations without the scale-related issues pervasive in prior art map-based solutions.

To provide timely and accurate positional information regarding the user and other contacts in (or outside) the network, the exemplary embodiment uses a multi-source approach, as well as algorithms specifically adapted to evaluate the information from each source (and the relevance of the source at any given time or context) to arrive at an optimized value. Myriad different data sources can be used by the system, including e.g., GPS, cellular base station triangulation/ranging, IP addressing and presence in ad hoc networks, The present invention also makes use of the concept of "proximity". While one specific instance of proximity comprises determination of a physical or actual distance, the invention is equally applicable to use of cognitive or psychographic proximity, such as where the "closeness" of something perceived by the user is defined in other terms. For example, a user might consider their family members very cognitively proximate (they see them and talk with them frequently), yet these family members may be physically disposed at any number of distances from the user's location. This expansive definition of proximity provides the invention with many different ways of describing and categorizing user information, thereby giving the user a high degree of flexibility in their preferences and display modes. It also leverages the inductive or "pattern recognition" capabilities of the human mind to provide the user with a memorable and simple, yet powerful display paradigm that also obviates much manual (e.g., key panel) data entry associated with prior art mobile device information management systems.

"Clustering" is also optionally employed within the invention. Clusters comprise a set of contacts or entities grouped in accordance with a categorization or association scheme. Subgroups and structure within one or more dimensions of interest (e.g., physical location or cognitive/psychographic factors) can accordingly be identified, and used as a basis for display and information organization.

Another salient advantage offered by the invention is the ability to instigate increased use of the mobile communications network, thereby increasing user satisfaction and also service-provider revenue. Specifically, by more efficiently and effectively managing personal preference and contact information for users, and relating this to their in situ condition on a real-time basis, the user is offered significantly greater opportunity to contact friends, family, businesses, etc. Simply stated, one aspect of the present invention eliminates the "out of sight, out of mind" disability of prior art information management systems in the mobile environment.

The present invention is also flexible in its deployment; many if not all of the functions can be performed at a centralized server, at a third party site or provider, or even on the user's mobile device itself. It can also be readily layered on existing systems, and even adapted to make use of indigenous protocols of the network and mobile device (e.g., WAP, SIP, etc.).

A variety of business methods and paradigms that leverage the foregoing technology are also described.

DETAILED DESCRIPTION OF EXEMPLARY EMBODIMENTS

Exemplary embodiments of the apparatus and methods of the present invention are now described in detail. While various functions are ascribed herein to various systems and components located throughout a network, it should be understood that the configuration shown is only one embodiment of the invention, and performing the same or similar functions at other nodes or location in the network may be utilized consistent with other embodiments of the invention.

Also, the various systems that make up the invention are typically implemented using software running on semiconductor microprocessors or other computer systems the use of which is well known in the art. Similarly, the various process described here are also preferably performed by software running on a microprocessor, although other implementations including firmware, hardware, and even human performed steps, are also consistent with the invention.

It will further be appreciated that while described generally in the context of a network providing service to a customer or consumer end user domain, the present invention may be readily adapted to other types of environments including, e.g., enterprise (e.g., corporate), public service (non-profit), and government/military applications. Myriad other applications are possible.

Lastly, while certain embodiments are described in the context of the well-known Jabber client/server protocol, Internet Protocol (described in, inter alia, RFC 791 and 2460), the Wireless Application Protocol (WAP), or Session Initiation Protocol (SIP), it will be appreciated that the present invention may utilize other types of transport mechanisms, protocols (and in fact bearer networks to include other internets and intranets) to implement the described functionality.

Mobile Communications Device and Network—

FIG. 1 is a simplified block diagram of a mobile communications device configured in accordance with one embodiment of the invention. The mobile communications device (MCD) 100 in a computerized device that includes a keypad 104 or other such input device (including optionally speech recognition capability) for the input of information such as telephone numbers and contacts names. A display 102 is also provided for viewing information, which may include for example, text, graphics, iconic representations, video, etc. The display device may be, for example, LCD, thin-film transistor (TFT), plasma, or even a cathode ray tube (CRT) of the type well known in the art. The display may also comprise soft function keys (SFKs) with touch-screen capability generated by the MCD for implementing various functions such as entering various operating modes, shortcuts, etc.

The MCD user(s) may input numbers, names and other information into the MCD 100 via the input device 104. Such contact information may also be downloaded to the MCD via other connections or interfaces (not shown) including wire-line and wireless connections (e.g., a Bluetooth or PAN interface), such as between two devices and their client applications. Synchronization between the two client applications on the respective devices may be accomplished using any number of available protocols, including for example the well-known SyncML protocol now ubiquitous on many cellular telephones and PDAs. Alternatively, the contact information may be collected and stored as calls are made and received Once entered, the contact information may be viewed on the display 102 by the user. For example, a typical display structure might comprise a menu or alphabetical listing of the contacts by name, geographic or psychographic proximity, etc. The user may then select a number to dial using the keypad 104 or other input system such as scroll wheel, miniature "joystick", or jog dial (not shown), the construction and use of which is well known in the art. Communications other than telephone calls may also be made, including "chat"/ instant messaging, PTT (push to talk), and e-mail.

The MCD 100 comprises, in the exemplary embodiment, a cellular telephone or "smartphone", but any other type of mobile or nomadic client device may be employed as desired. For example, a laptop computer, hand-held computer or PDA with a wireless interface connection such as an IEEE Std. 802.11 "WiFi" or 3G (i.e., UMTS, 3GPP, 3GPP2, etc.) enabled computer card may comprise the MCD 100. A substantially fixed communications device (e.g., a desktop PC or the like) may also be employed consistent with the invention; however the benefit provided by the invention will be somewhat reduced due to the lack of mobility of such a substantially fixed communication device. "Fixed" devices located on substantially mobile platforms (e.g., cars, trucks, etc.) may also be utilized. For example, the MCD 100 may comprise an integrated circuit or dashboard-mounted device in a vehicle.

The MCD 100 preferably interfaces with a base station or other access point via radio frequency electromagnetic signals (RF signals) that are modulated in accordance with one or more communications standards or protocols. Examples of useful standards include, inter alia, GSM, CDMA-2000, W-CDMA, TDMA (IS-54 and IS-136), PCS, UMTS, EDGE, and IEEE 802.16, 802.15 or 802.11. The use of other standard or non-standard wireless interfaces is also consistent with other embodiments of the invention, which is in no way limited to any particular standard or air interface. Alternate embodiments, for example, may use GHz-band satellite transceivers.

Typically, the MCD 100 includes a microprocessor and integrated circuit or other memory for storing programs that are executed by the microprocessor (not shown). The software running on the microprocessor controls the operation of the MCD including processing input, generating display data and generating messages to be transmitted via the wireless link.

The client device (MCD 100) runs the client application ("client"). The server 204 of FIG. 2, et seq. (described subsequently herein) includes its own software application that processes the client requests, and sends messages to the corresponding client process. It will be appreciated that while described in terms of a client application and a server application, the present invention is typically embodied in the form of corresponding protocol stacks resident on each of the communicating machines. These stacks are configured to include, inter alia, an application (user) layer, and physical/network) layers that allow interface between the two devices to occur over the interposed bearer medium. Session and security layer processes (e.g., WSP and WTLS in a WAP environment) may also be interposed in the stack of each device, as well as other types of functionality well known to those of ordinary skill in the art.

Figure 2:
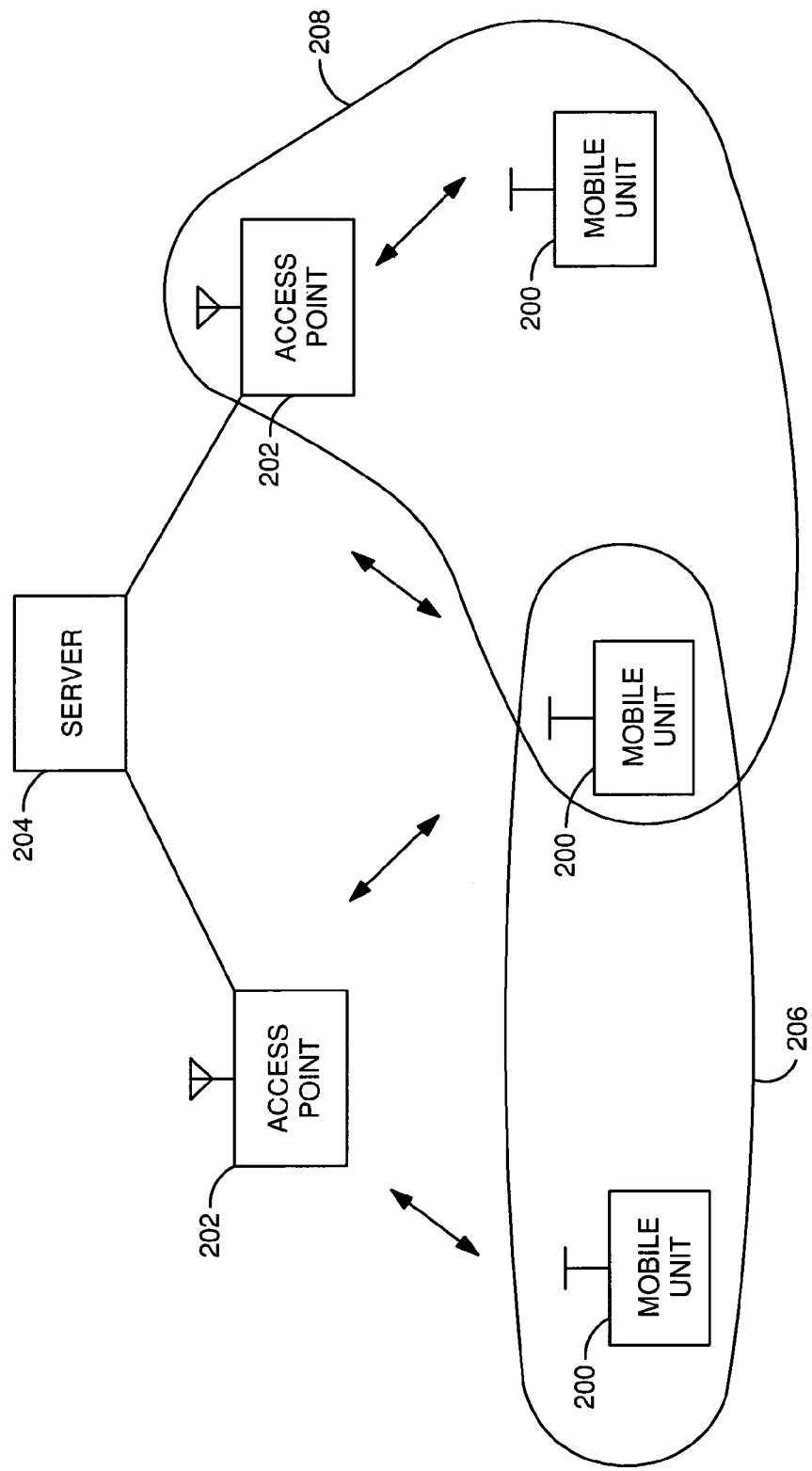
FIG. 2 is a block diagram of an exemplary mobile communications network configured according to the invention.

FIG. 2 is a block diagram of a wireless network configured in accordance with one embodiment of the invention. Mobile communication devices (labeled as mobile units in the Figure) 200 interface with access points 202 via wireless RF signals. The access points 202 are then connected to a server 204 or other network entity via wired or another wireless link. The server 204 is typically co-located (or can even be integrated with) with other equipment including, inter alia, base station controllers (BSCs), transcoding frames (TCFs), home or visitor location registers (HLRs/VLRs), and mobile switching centers (MSCs) of the type well known in the art.

The access points 202 may comprise, for example, cellular base stations or wireless internet routers (using technology such as WiFi or WiMAX) connected directly to an internet (e.g., the Internet) or other network. The links between the access points and the network may be wireless or wire-line in nature as well. In one variant, the MCDs 100 can communicate with one or more access points 202 depending on the location and status of the MCD 100. For example, in a handoff situation, a mobile unit 200 may be in communication with multiple access points 202 simultaneously. Similarly, the mobile unit may be in a dormant or "sleep" mode with respect to one access point, yet in communication with another.

The server 204 may be a single machine, or a network of machines functioning together. A logical communication stream is bi-directionally established between the corresponding client and server processes.

As shown in FIG. 2, the various mobile devices may form ad hoc networks 206, 208, either directly between themselves (network 206) or between one or more mobile devices and an access point 202 (network 208). For example, a "master/ slave" relationship may be created in a Bluetooth network, or an AP/STA relationship in an 802.11 network. The access point(s) 202 in such case may also not be part of the underlying cellular network per se. Other types of ad hoc networks and protocols may be used as well.

Exemplary implementations of the network of FIG. 2 have been rendered by the Assignee hereof based on a Jabber infrastructure, selected at least in part based on its convenience for customizing basic protocol packets (XMPP) exchanged between the client and server. This embodiment is advantageously agnostic to any particular form of presence representation. Appendix I provides details on this exemplary Jabber-based client-server protocol, as implemented in the context of an exemplary Motorola "*MyCommunity*" infrastructure such as that described in United States Patent Publication No. 20040017376 to Tagliabue et al previously referenced and incorporated herein.

Figure 3:
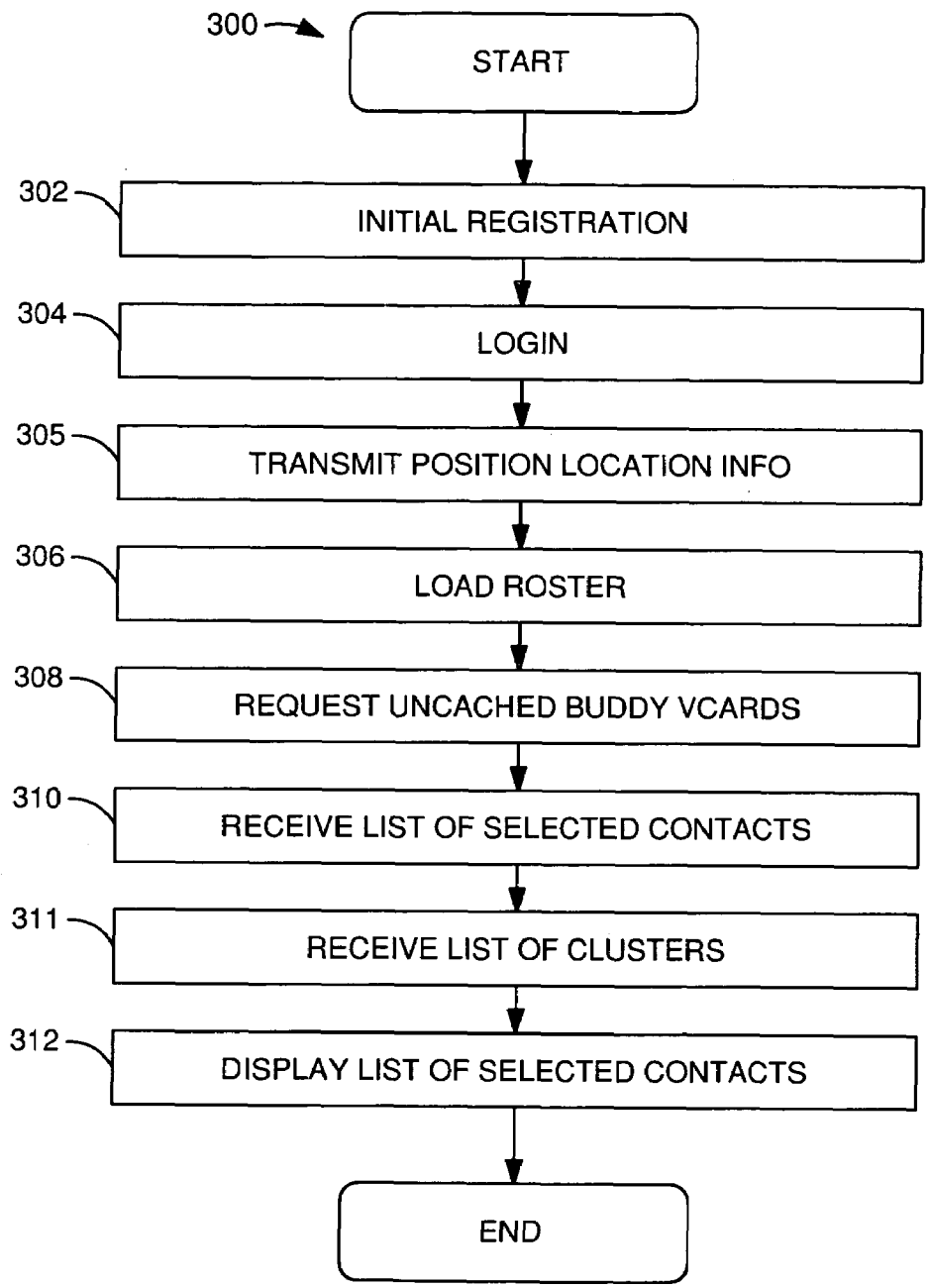
FIG. 3 is a logical flow chart illustrating an exemplary client-side process performed in accordance with one embodiment of the invention.

FIG. 3 is a logical flow chart illustrating the operation of the MCD 100 of FIG. 2 in accordance with one embodiment of the invention. The method 300 begins at step 302 wherein initial registration of the MCD (via its client application) is performed. Initial registration is typically performed via a registration message transmitted to the server 204 by way of the wireless link (and any other interposed links). For example, one variant of the method utilizes a pre-existing registration protocol message as the basis for registration in the current context (such as, e.g., a Jabber, WAP or SIP message).

Registration is followed by a login at step 304. The login message is typically transmitted from the MCD 100 to the server 204 by way of the wireless link. The registration and login messages may also be combined if desired, thereby reducing network overhead during connection establishment. Per step 305, the MCD physical position is determined (such as via triangulation, GPS, or other such means), and this information is transmitted to the server 204 via one or more preformatted messages that uniquely identify the MCD (e.g., via a device_ID, IP address, or the like).

The physical location may be determined by requesting the physical location of the base station or access point via other messaging, or alternatively by having the base station or access point perform the position location and forward this to the MCD. This may be accomplished in various ways including, inter alia, by determining the particular antenna with which communication is being conducted, and/or the strength at which the signal is received. Additionally, the round trip transmission time may also be calculated to determine the distance of the MCD 100 from the access point. The resulting information may then be used by the access point to estimate the physical location of the MCD 100 or forwarded to server 204 for estimation calculation there. The server or base station/access point can merely retain the location information for each MCD, and then act upon any requests received from the MCD or its proxy (e.g., WAP server) with respect to proximate "clusters" as described subsequently herein.

In other embodiments of the invention, the MCD 100 determines its physical location autonomous from the server 204 by processing Global Positioning System (GPS) or other such signals. This physical location is then transmitted to the server 204. In some instances, the physical location of the MCD 100 will be updated periodically or when a change in location is detected. The server 204 or access point may also request (and even instigate) location updates from the MCD 100, so as to keep a local database updated. For example, at each login of the MCD, or each handoff to another base station, the server 204 may request a location update from the MCD.

In still other embodiments of the invention, the presence of a user's MCD within an ad hoc network 206, 208 can be used to provide location or proximity information. For example, if the server 204 or its proxy knows that a given MCD is part of an ad hoc network coupled to a particular WiFi access point 202, then the server/proxy can apply heuristics or a priori rules regarding the physical location of that MCD relative to the user being served or a fixed location, since the location of the access point is known by the server/proxy. While somewhat less precise than GPS or triangulation, this approach obviates many of the messages between the server and MCDs necessary to update the latter's position. Determination of presence within a given ad hoc network can be accomplished by, inter alia, IP address.

Access to HLR/VLR databases or functions of the type well known in the art can also be used to provide information to the system regarding the user's location.

Bluetooth and WiFi "beacon" functions can also be exploited to provide position or proximity information.

Another variant of the invention aggregates contacts of inclusion on a list or cluster by looking at the participation or presence of that user in the service provider's network. Hence, out-of-network users can be selectively filtered by a service provider, with such capability (i.e., trans-network clustering or proximity analysis) forming the basis of a possible business model.

It will be recognized from the foregoing variety of location information sources that the exemplary embodiments of the invention may be highly redundant and "multi-sourced". The server 204 (or proxy agent) may also include algorithms which leverage this high degree of information availability in order to select the best (often but not always the most accurate) source for generating the location/proximity estimates that are ultimately sent back to the user (or generated indigenously on their MCD). For example, one variant of the algorithm takes the various position information from the multiple available sources, and aggregates it (such as via weighted or unweighted mathematical averaging) to arrive at a single coordinate, estimate or prediction. Alternatively, a confidence level can be assigned to each source (based on, e.g., historical data, prevailing operating conditions, etc.), and the sources can be selected in order of decreasing confidence level. Myriad other approaches will be recognized by those of ordinary skill in the mathematical and signal processing arts.

The selection of source can also be made context-dependent; for example, in certain geographical areas, cellular base-station triangulation may not be practicable. Similarly, if no ad hoc networks are established, location data from these networks is not available.

Furthermore, accuracy (e.g., spatial resolution) of the various location sources can be used as a selection criteria as previously noted.

The location determination algorithms of the invention may also optionally utilize status information as an input to a weighting or prediction mechanism. For example, if the user's status is indicated to be "in transit" or "driving", it is expected that the user's location will vary fairly rapidly as a function of time. Hence, this information can be used to adjust the cluster or other calculations to account for this rapid variation. Alternatively, the system can simply suspend updates until the user stops moving or changes status. As another option, the user's position some time in the future can be predicted, such as where the user's status includes "waypoint" information (i.e., "in transit to home"). Since the user's home is a fixed location, and their present location is known, an extrapolation can be performed, which can also account for weighting due to natural geographic features (lakes, mountains, etc.) if desired.

Third-party location information sources may also be utilized consistent with the invention. For example, the so-called "PlaceLab" system developed by Intel Corporation (Seattle, Wash.) provides geo-positioning data aggregated from multiple sources (including GPS and Bluetooth, as well as cellular infrastructure) while also maintaining user privacy.

At step 306, a roster is loaded from the MCD 100 to the server 204 also using the wireless link. In the exemplary embodiment, a "roster" comprises a list of contacts and associated information contained in the MCD 100. This contact list can include the name, address, phone number, chat ID and e-mail address of each contact in the list. Rosters for multiple users of the same MCD can also be loaded if desired.

At step 308, the MCD optionally requests uncached data structures (e.g., uncached "buddy" vCards) from the server 204. In additional to the cards associated with the list of contacts, the MCD 100 may also upload other (unrelated) "vCards" or updates to existing cards at this point.

The vCards in the exemplary embodiment comprise virtual business cards that may include information such as photos of a given contact, and the method of communication preferred by that contact. For example, a first contact may prefer to be contacted via e-mail while a second contact may wish to be contacted via voice connection. Other contacts may prefer to use chat. This preference can also be used as a basis of filtering, organizing or prioritizing contacts (and their information) as well. For example, if an MCD is not video enabled, a point-to-point multimedia connection or conference between that MCD and a contact is not possible. Hence, the MCD client application would recognize this (such as by checking its hardware/software registry), and reprioritize the "preferred" contact methods listed for that contact such that the next highest priority method that is enabled by the MCD is selected. Hence, in this fashion, the vCards of the present invention are mutable in that their information can be altered in a user- or MCD-specific fashion, dynamically during use. Also, the preferred form of contact may depend on the time of day or location of the contact (or the user), as described in greater detail below.

At step 310, the MCD 100 receives a list of selected contacts. The contacts are typically selected by the server 204 based on certain criteria. In one embodiment of the invention, these criteria include the proximity of the contact(s) to the MCD 100 at that point in time. That is, the contacts whose MCDs are located within a threshold distance from the current MCD 100 are selected, and a list of the selected contacts is transmitted back to the MCD 100. In one variant of the invention, the threshold distance can be configured by user input, such as via selecting one of a plurality of pre-selected values (e.g., 100 m, 1 km, 5 km, etc.).

In another variant, the threshold is made mode- or link-specific, such as where the threshold value is set to a first value for a cellular contact mode, and a different (smaller) value for a WiFi or Bluetooth mode. Hence, if the MCD user only wants to say perform Bluetooth inquiries for "buddies" within a crowded location such as a sporting event or concert, they can specify a "short range" mode, wherein the server or access point only returns contacts within the prescribed short range.

The threshold can also be varied as a function of operating conditions, such as time of day, day of the week, operating mode of the host MCD, etc. It can also be coupled to one or more other criteria, such as the availability of certain modes of communication, etc.

In one embodiment of the invention, the filter or list criteria includes a physical distance that takes into account natural boundaries or separators (i.e., features which may impact "cognitive" distance). For example, the physical distance over a body of water such as a river or lake may be weighted more heavily than physical distance over land, due to the intrinsic difficulties of traversing these features (or going around them). Mountainous regions or those with particularly bad weather conditions can also be considered. In the case of weather, this can be a highly dynamic parameter, and hence this weighting (if employed) can optionally be made to be a function of time/location. For example, when the MCD is located in a region with heavy snow falling, the distances to all contacts in that region may be artificially expanded (weighted more heavily), so that a more realistic representation of proximity or cognitive distance is presented; even a short drive in heavy snow can be treacherous and time-consuming. This functionality can be coupled to real-time weather (NWS, etc.), road condition, or other such reports in order to provide dynamically variable real-time proximity weighting within the MCD 100 (or server 204).

Similarly, regions with a known high crime rate or other impairment could be viewed as a natural separator or cognitive proximity "expander". Traffic or lack of roads could also be viewed as natural separators.

Other selection criteria may also be used including proximately to other landmarks or points of interest. These landmarks may be pre-programmed into the MCD or server 204, or alternatively may be entered on-the-fly by the user, either manually by entering coordinates, or semi-automatically by the user invoking a coordinate "save" function when they are proximate or at the landmark. Landmarks may also be fitted with a transponder or interrogator which automatically triggers the MCD to record its position (and name, etc.) when the MCD is sufficiently proximate to the landmark, somewhat akin to an active or passive RFID tag.

In still other embodiments of the invention, contacts may be selected based on categories such a business or family connection. These categories are part of the larger group of so-called "psychographic" classifications, wherein some logical or other relationship between the group members and the MCD user is used as the basis for populating the contact list(s). This may be used in conjunction with the geographic functions as well, such as for example where the MCD/server generate a list of all family members within 2 km of the MCD's location. Any number of different psychographic or cognitive criteria can be employed by the present invention, including without limitation alumni of the same university, people of the same ethic or racial background, people who speak a particular language, people who have identified themselves as having interest in a particular topic or area (e.g., museum-goers, physicists, etc.), people who use e-bay on-line shopping service; the list is practically limitless.

Herein lies a salient advantage of the present invention, specifically regarding the ability of users to customize their experience with the MCD 100 through a set of user preferences. Once entered, these preferences can form the basis of multiple different screening or filtering criteria, which the user can switch back and forth between at will. For example, the user might first want the group of geographically or psychographically or cognitively proximate "buddies" displayed. Then, via menu selection or other input (e.g., speech recognition unit), the user may select all Bluetooth enabled devices within "pairing" range (which can also be determined indigenously via the Bluetooth interface and pairing function of the user's MCD). Next, they may select all family members, and so forth. In this fashion, each user can gain multi-faceted knowledge regarding the placement of various geographically and/or psychographically related contacts in a very short period. These displays or mappings can also be saved and even overlaid atop one another if desired (see, e.g., the discussion of FIGS. 12 and 13 subsequent hereto).

It will also be recognized that the MCD client software (or even the server 204) can integrate and manage related information from multiple disparate lists if desired. For example, intrinsic to a Bluetooth interface are the inquiry and pairing processes, which generate lists of their own (e.g., those within range who have allowed their device to be inquired or paired). This list may contain contacts that are also on another list, such as via their interface with the server 204 (i.e., another MCD in the network). The MCD client software can therefore be programmed to recognize this duality, and (i) eliminate repetitive displays of the same contact (e.g., once as a Bluetooth contact, and once as a family member), and (ii) maintain the duality on separate displays (e.g., avoid removing the same contact from the "Bluetooth only" display when that same contact is also on another list).

In one embodiment of the invention, the contact/data selection or filtering process is performed at the server 204, and the results are downloaded to the MCD 100 per step 310. This approach relieves the MCD (comparatively "thin" in terms of capability as compared to the server) from performing such processing. In alternative embodiments, server 204 downloads a larger or superset list of contacts and information related to the selection criteria specified by the MCD 100, and the actual selection processing is performed within MCD 100. This approach allows the MCD to rapidly customize its selections without having to communicate with the server again, and provide several successive downloads. The contact information can also be stored on the MCD, such as in the form of a complete master contact list, from which the MCD selects the desired subset of contacts based on the selection/filtering criteria invoked by the user.

At step 311 of the exemplary method, a list of "clusters" is received by the MCD. Clusters are a set of contacts or entities grouped in accordance with a categorization or association scheme. Subgroups and structure within one or more dimensions of interest (e.g., physical location or cognitive/psychographic factors) can accordingly be identified. In one embodiment of the invention, the categorization scheme comprises physical proximity to a coordinate, know landmark or point of interest. For example, a first cluster could be all contacts located at or near an office, indicating such contacts are at work. Another cluster could be family members located at one or more houses. Another cluster could be people located at a concert or stadium event. Still another cluster could be contacts located near a school or university. As previously described, this clustering may be geographic, psychographic, or according to any other categorization scheme. Hence, psychographic or cognitive clusters might comprise Various types of pre-existing clustering algorithms may also be employed with the invention. For example, K-means, Self Organizing Maps, or hierarchical clustering of the type known in the art can be used.

Per step 312, the selected/clustered contacts are displayed on the MCD 100 display device. For example, once the list of contacts within a threshold distance is determined, these "proximate" contacts may then be displayed on the display of the MCD 100 so that a user can observe which contacts are in the vicinity. As previously discussed, the threshold distance may be adjusted based on user configuration parameters that can be input by the user or changed by the network. For example, during a concert or other events the distance could be set to 100 meters. When on a school, campus the distance could be set to 500 meters. And in the city the threshold distance could be set to yet a different value, e.g., 3000 meters.

These different modes or templates can be manually selected by the user, such as via a menu selection or speech input. They may also be adjusted dynamically based on the user's pre-programming of proximity to landmarks. For example, the user may program in personal "waypoints" which the MCD (or server) uses as the basis in determining which proximity template to apply. When within a certain distance of the geographic center of a university campus waypoint, the MCD 100 will automatically switch to the "school" mode, wherein the threshold distance is set at 500 m. Similarly, when within a prescribed distance of their office, the MCD switches to the "work" template and applies another prescribed distance threshold.

The user may select a cluster for a more detailed view of the contacts. In terms of display format, one embodiment of the invention displays just a list of contacts located within the threshold distance, such as in alphabetical order or order of closest to farthest proximity (as specified by the user). In some instances, the actual distance of each contact may be displayed along with the contact name, and sorted as previously described. In still other embodiments, a grid or other display projection may be created and the contact names displayed on the gird or projection in accordance with the approximate distance from the MCD 100.

In still another embodiment of the invention, MCD 100 displays a geographic map of the area superimposed with the contacts at the corresponding physical location. The geographic map may be part of a map database stored within MCD 100, or it may be retrieved via the network and/or from server 204.

In yet other embodiments, the actual direction of the contact relative to the user's MCD can be determined and displayed as well. Through use of cell base station or access point triangulation, signal strength, indigenous MCD sensors (e.g., electromagnetic compass), or other means well known to those of ordinary skill, the orientation or attitude of the MCD relative to its surroundings 200 can also optionally be determined, so as to provide the user with an "electronic compass" for locating the displayed contacts. Specifically, the display of the MCD might include a dynamically variable vector which points in the direction of the selected contact irrespective of the actual angular attitude of the MCD. This would be useful for the user trying to locate someone physically by using the display, which can be difficult to translate into actual (relative) bearings, since the MCD 100 operates on an absolute reference coordinate system. When so equipped, the user can hold the MCD in a relatively stationary and flat position (display substantially parallel to the ground), select a contact, and the MCD client application will generate a vector (and distance indicia) pointing in the actual direction of the selected contact.

In an alternate embodiment of the invention, server 204 has access to a geographical database of landmarks such restaurants, hospitals, tourist attractions or other points of interest. The database may be maintained with the server 204 or located elsewhere (such as at a URL operated by a third party) and connected via a network or other connection to the server 204. In this fashion, contacts from a particular MCD 100 may be grouped by the server or the MCD into "clusters" each associated with a particular landmark or point of interest. The clusters associated with the landmark(s) can then be displayed on the MCD display device. For example, a first cluster may be configured around the user's workplace. A second cluster could be configured around the user's home or club. Other clusters could be configured around airports, stadiums and other points of interest. The clusters can be displayed as labeled graphical objects (e.g., "Work"), or over a geographic map or other representation of the points of interest and major landmarks.

Figure 13:
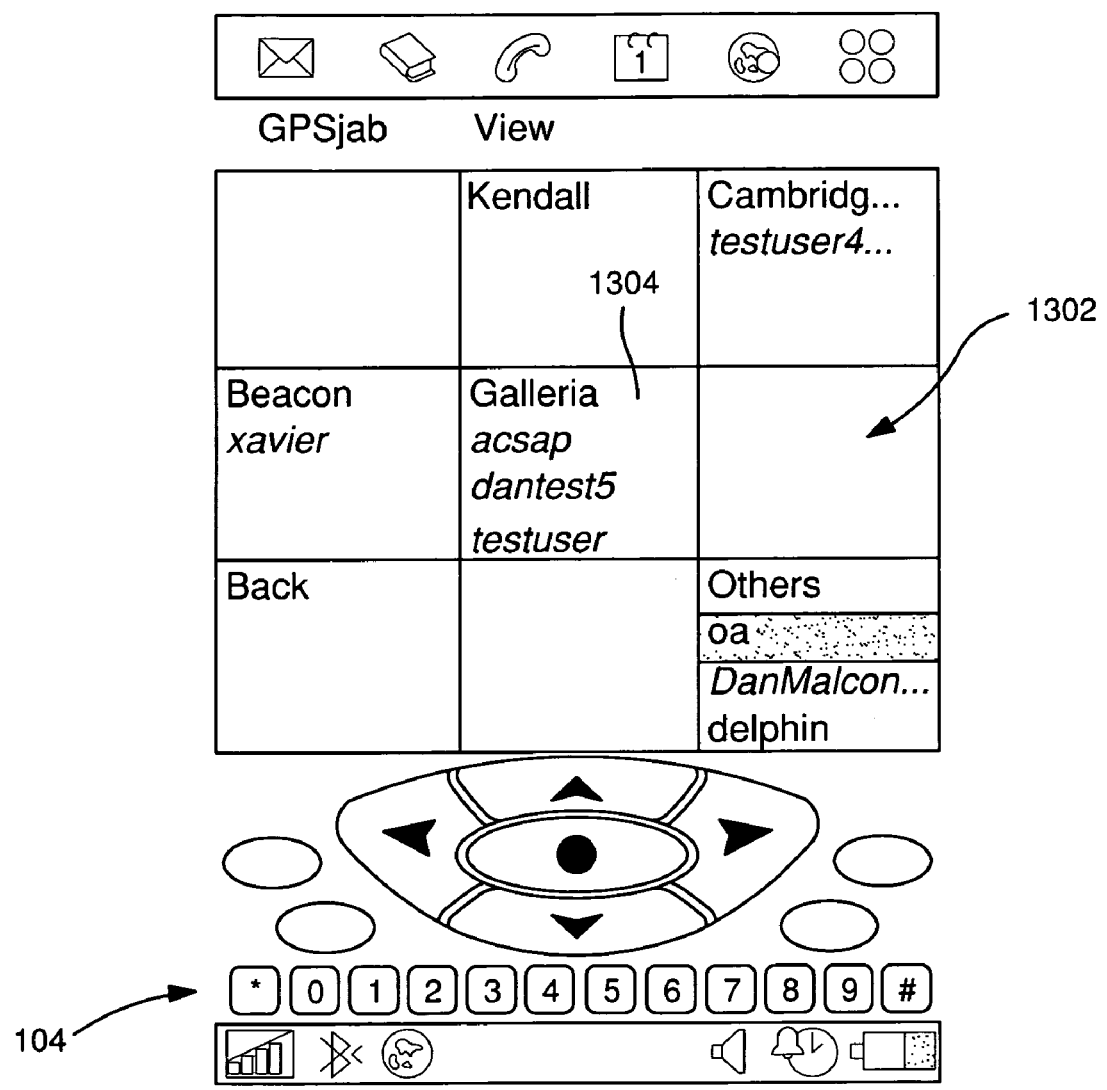
FIG. 13 is a graphical representation of another embodiment of the MCD display image according to the present invention, wherein a grid format is used.

The clusters may also be contemporaneously shown in tabular or other fashion. For example, in one embodiment, a simple grid could be generated with a cluster shown or listed in each square of the grid. In this fashion, the user can be apprised of the contact "density" associated with multiple clusters (or types of psychographic/geographic themes) at once. This is useful from the perspective of allowing the user to see which mode of operation will produce the most results in terms of contacts; e.g., there may be few or no family members in proximity to their location, but many business associates. See the discussion of FIG. 13 provided subsequently herein.

Once the contacts have been displayed, the user may select one or more of the contacts with which to initiate a communication session. In one embodiment, the user may also select the type of communication session to initiate, or a default type may be used depending on the contact information selected or the preference including in a vCard entry. For example, the user might initiate a cellular telephone call to a single user. Alternatively, the user might multi-cast a vCard or chat message to a plurality of the users (e.g., all family members). Multiple communication modes can also be sustained simultaneously if desired; e.g., cellular call with Contact A, Bluetooth pairing with Contact B, and WiFi connection with Contact C.

Figure 4:
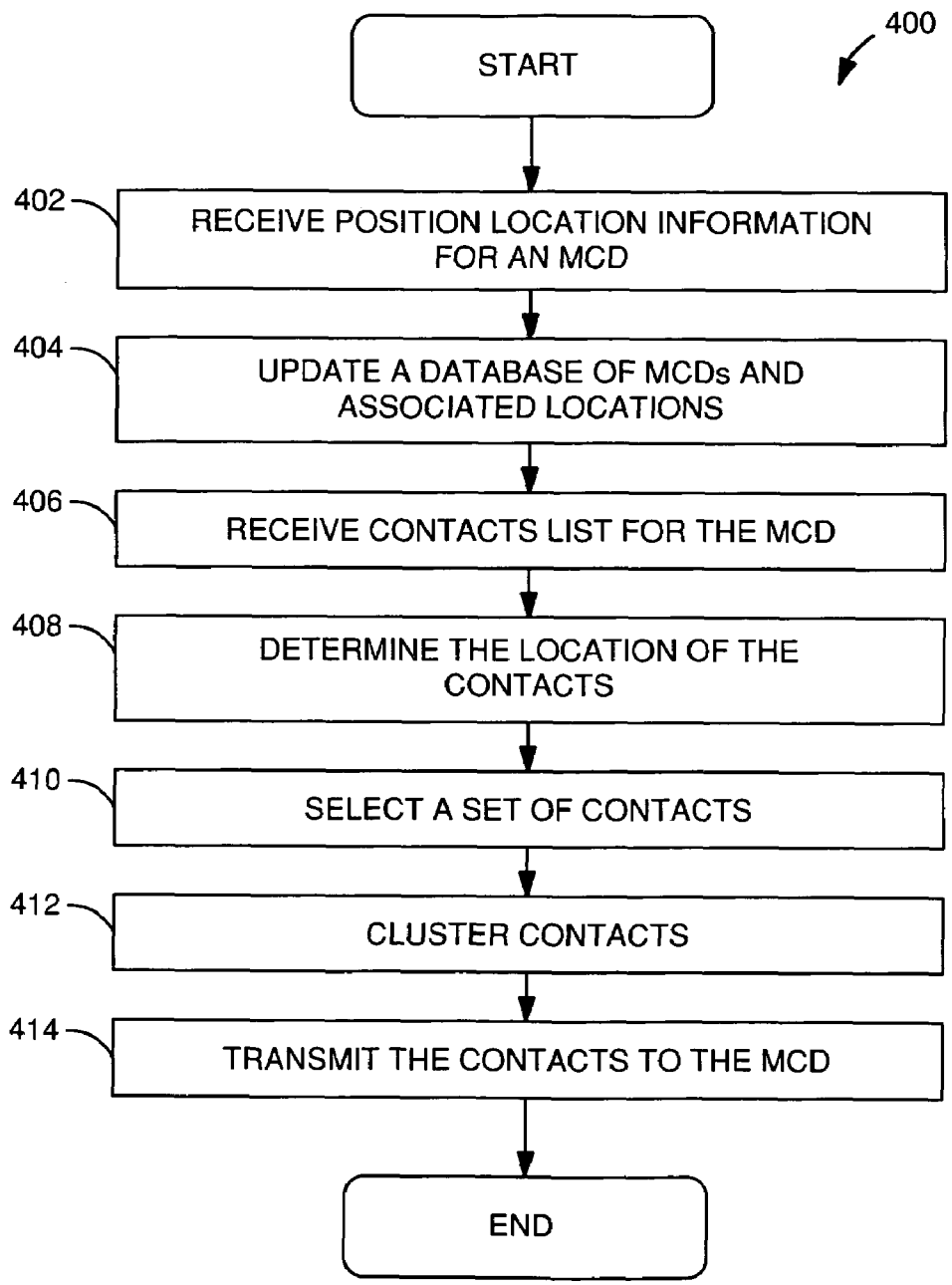
FIG. 4 is a logical flow chart illustrating an exemplary server-side process performed in accordance with one embodiment of the invention.

FIG. 4 is a logical flow chart illustrating the operation of server 204 of FIG. 2 when configured in accordance with one embodiment of the invention. The process 400 begins at step 401 wherein the position location information for a particular MCD 100 is received (or generated indigenously by the server or another connected entity, such as a base station or BSC). The position location information preferably comprises the coordinates (e.g., latitude and longitude or UTM information) for the MCD 100.

At step 404, the server 204 updates a database of MCDs and their associated physical location using the position location information received at step 400. This database may be maintained at the server 204 or at another location as previously described. The server 204 may also be configured to communicate with other networks that track the location of other mobile units on other network(s), and vice-versa, thereby allowing the invention to maintain "cross network" lists if desired. This is particularly advantageous in terms of maintaining user contact lists that are not network-specific or limited to one carrier or type of service. It is particularly useful to the MCD users when they can see all contacts meeting their criteria, and not just those "in network" for a particular carrier or service provider.

At step 406, the server 204 receives a contact list from the MCD. The contact list will preferably include various types of identification (ID) information including name and telephone numbers, chat ID or e-mail. This list may also be pre-stored on the server (or retrieved from another network agent such as a URL or database).

At step 408, the server 204 determines the location of at least some of the contacts on the contact list received/retrieved at step 406. This determination may be done by matching the phone number or other ID to the position location database maintained within server 204. In other instances, the phone number or other ID information may be forwarded to other networks for position location. The proximity determination may also be performed by identifying all entities within the threshold distance, and then filtering or matching these with entries on the contact list.

At step 410, a set of the contacts are selected based on one or more geographic, psychographic, or other criteria as previously described. In the illustrated embodiment, the criteria include the proximity of the contact(s) to the MCD 100 currently being processed. In particular, the server 204 will compare the current location of the MCD with the location of the MCDs of the contacts on the contact list. The contacts located within a threshold distance will then be selected.

At step 412, the contacts are optionally grouped into clusters. In the present context, clusters comprise groups of contacts that share some characteristic. For example, clustering may be performed based on proximity to various landmarks or points of interest. In this embodiment, the server 204 maintains, or has access to, a geographical database that includes points of interest.

The server 204 calculates the distance between each contact and a set of one or more points of interest. This can be done at time of selection (i.e., threshold proximity evaluation previously described), or after the clustering has occurred. The contacts can also be divided into clusters based on the distance from a particular point of interest, with "distance" comprising either the actual or weighted distance(s). For example, all the contacts within a certain distance from the user's office will be placed in a first cluster, and the contacts within a certain distance for the user's home will be placed in second cluster. The different clusters can also be referenced to a single point; e.g., a first cluster comprising all users from 0 to 2 km from the user's present position (or home, office, etc.), a second cluster from >2 km to 10 km, and so forth.

At step 414, the contacts are transmitted to the MCD 100. The contacts are preferably transmitted along with the position of those contacts and, in relevant embodiments, the particular cluster to which the contact has been assigned. This information can be transmitted in any number of different forms or data structures that are both efficient for the interposed wireless link (i.e., low bandwidth) and easily accessed and processed by the client application running on the MCD. Pre-existing message protocols resident at various layers of the protocol stacks of the MCD and server can also be used for this purpose, thereby obviating the need for new message protocols.

In an alternate embodiment of the method of server operation, the server 204 automatically determines a "contact list" for the MCD based solely on its position and threshold information. For example, once the server 204 or associated processing entity receives the position information and user-specified threshold data from the MCD (or from another source such as a third party location service and/or database), the server 204 can search its in-network or trans-network MCD location database for other MCDs within the prescribed threshold distance. This "gross" or un-clustered list can then be transmitted to the MCD for further filtering by the client application algorithms as previously described, or can be stored locally for subsequent processing by the server 204 (such as when further preferences are received from the MCD). It can also be displayed directly on the MCD if desired without further processing.

In some embodiments of the invention, the server 204 will also provide geographical information to the MCD 100 such as maps of the area around the user. This information can then be used by the receiving MCD 100 to display the area as well as the location of the contacts/landmarks/waypoints thereon. Topographical or other such information can also be downloaded to the MCD and used as the basis for distance weighting as previously described.

As previously discussed, during operation in accordance with one embodiment of the invention, a MCD 100 will register with the server 204 via access point 202. Following the registration, MCD 100 will typically perform a "load roster" operation. During the load roster operation, a list of contacts is transmitted from the MCD 100 to the server 204 (or from a designated proxy to the server). The server 204 receives the position location information, contacts and/or vCards associated with each MCD 100, and stores the information for each such MCD in a database. Then, for a particular MCD 100, the server 204 will optionally match the contacts or buddies for that particular MCD 100 with other MCDs 100 on the network, or if available MCDs from other networks. Hence, the matching process is performed bi-directionally (i.e., for the contact list of each MCD, and also using each MCD as part of the database to which a particular MCD's list is matched).

In accordance with one embodiment of the present invention, a set of messages are defined which enable various functions to be performed by server 204. These functions include, without limitation: (i) a preference storage (e.g., "Store Application User Preferences") function, (ii) a retrieve preferences (e.g., "Retrieve Application User Preference") function, (iii) an electronic card or data retrieval (e.g., "Get vCards") function, (iv) a position-based cluster retrieval (i.e., "Get Buddy list and Cluster Information Based on User Position") function, (v) a position update (e.g., "Update User Location") function, (vi) a map display format retrieval (e.g., "Get Representational Map") function, and a (vii) a contact-specific retrieval (e.g., "Get vCard of a User") function. An MCD 100 may send messages over the wireless link to invoke these functions in the server 204, or alternatively send these messages via other channels, such as to a third-party proxy or web server, in order to obtain the desired information or invoke functions at that proxy.

The exemplary "Store Application User Preferences" function referenced above allows a user to update user- and application-specific information such as, e.g., a zoom level of any maps that might be viewed as well as the maximum number of buddies that may be viewed. Privacy settings such as location disclosure to other users, inquiry/pairing protocols, etc. may also be set. The exemplary "Retrieve Application User Preference" function similarly allows a user to retrieve previously stored user preferences; these may automatically be retrieved as well if desired, such as during rebooting of the MCD, logging into the network (or another network), etc.

The exemplary "Get vCards" function allows a user to retrieve vCard information including name, contact coordinates, image and other similar information. This information can also be used for automatically determining the accessibility options for that user (or the requesting user). For example, the vCard information can cause the client application on the requesting user's MCD to default to a prescribed "first contact" communications channel as previously described.

The exemplary "Get Buddy list and Cluster Information Based on User Position" function sends back clusters near a given GPS or other location coordinate based at least in part on a buddy list provided by the MCD 100.

The exemplary "Update User Location" function allows a user to send his current location to the server to be stored in the location database. This function can also be configured for substantially automatic updates; e.g., once every X minutes, upon login, etc.

The exemplary "Get Representational Map" function returns a link or other pointer to a map with information about specific buddy coordinates referenced to the map, in response to a buddy list and location information provided by the MCD user.

The exemplary "Get vCard of a User" function retrieves the stored vCard information for a particular user specified by in the request.

Other types of functions may also be employed. For example a "Get Buddy Status" function can issue a request to a proximate buddy of the issuing user to obtain a "status" (e.g., off-line/unavailable, busy, on-line, traveling, etc.). These status updates can also be programmed to be provided in a user-permissive fashion, or automatically as part of the contact selection/clustering process. The user of the MCD being requested can enter his/her status manually, or it can be determined automatically (such as where no activity on the device has been detected for a period of time, the status would be set to "inactive" or the like).

The exemplary embodiments of the present invention also advantageously provide the user with significant capabilities for preference management, including what information is shown to other MCD users in (or even outside) of the user's network. For example, a user may wish to show his/her family all available information regarding their whereabouts, status, etc., whereas the same user may want to share much less information with business associates or friends. These preferences can be saved on a per-user, per-cluster (e.g., family members in proximity) and per-context (e.g., at work, at home, etc.) basis, such that a given user can tailor what information is conveyed to any given contact at any given time.

Figure 5:
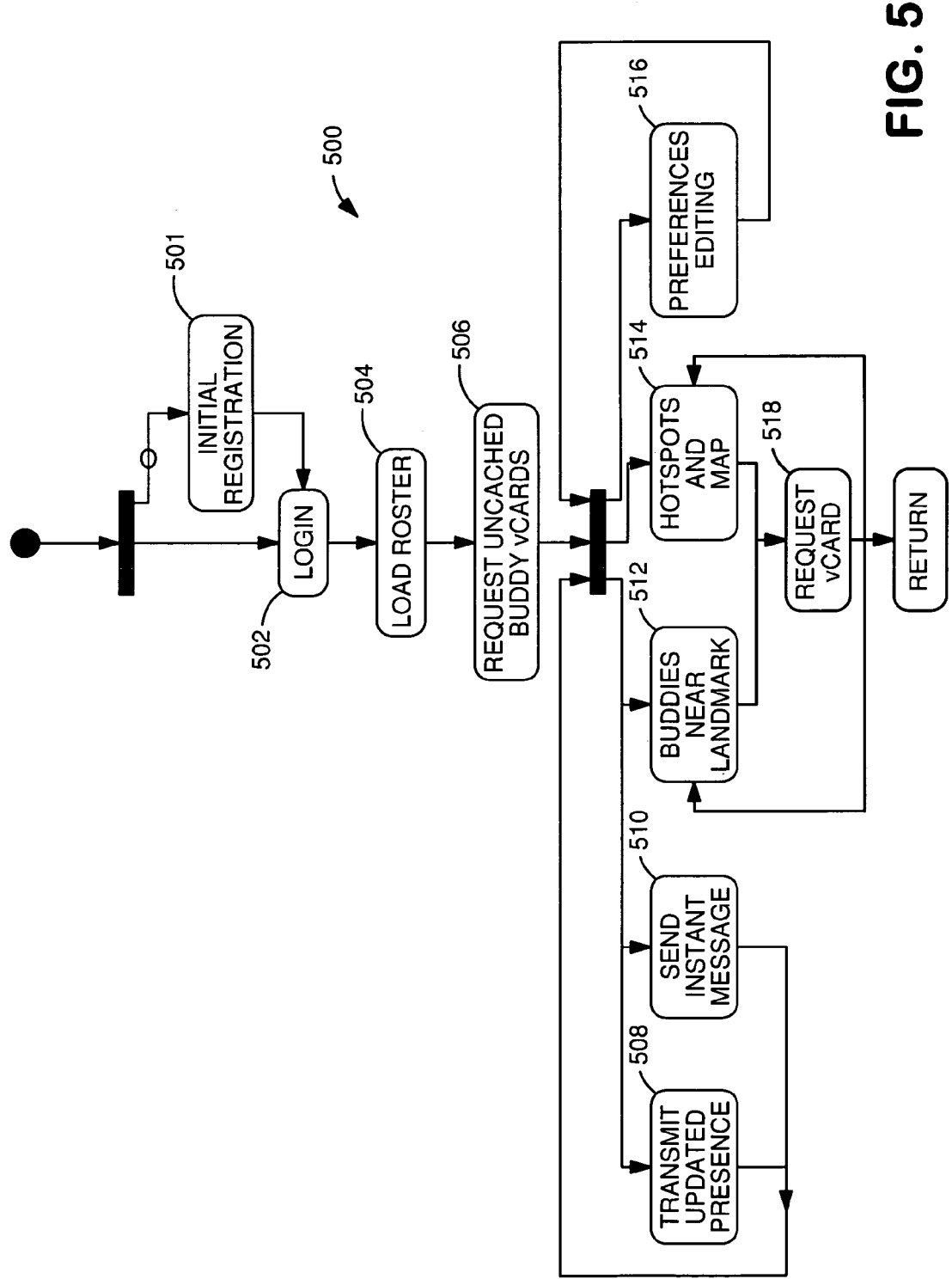
FIG. 5 is a logical flow diagram illustrating the various operating modes incorporated into certain embodiments of the invention.

FIG. 5 is a flow diagram illustrating the different operating modes that may be entered in accordance with one embodiment of the invention. The process 500 starts with an initial registration at power up per step 501. At step 502, login of the user to the network (e.g., server 204) is performed, and a load roster operation is then performed per step 504. This operation is followed by an optional request for uncached vCards (e.g., buddy vCards) at step 506. That is, the vCards that have not been cached by the MCD are requested. The lack of cached vCards may be due to any number of reasons, including e.g., recent updates to the buddy list since last login, wiping clean of the cache (e.g., to reduce storage overhead, reloading the O/S of the MCD, etc.), or operation in an off-MCD caching mode, wherein the vCards and even other data are intentionally cached off-MCD, such as at the server.

Once step 506 is performed, any one of a variety of operating modes may be entered. For example, preference editing by the MCD user may be performed at step 516. Alternatively, the hotspots and associated maps may be downloaded per step 514, which is followed by a vCard request at step 518. Once the vCard request is complete, control returns to main event loop.

The user-specific buddies near a landmark may also be determined per step 512. This step is also followed by a vCard request at step 518. An instant message may also be sent at step 510, or the presence of the MCD may also be updated at step 508.

It will be appreciated that while shown as logical parallel alternatives in FIG. 5, the aforementioned modes or steps may be conducted serially, as well as two or more being performed in parallel (contemporaneously). For example, based on its processing power and sophistication, the MCD client application can be configured to run multiple logical threads simultaneously, such as where an instant messenger client module (step 510) is used in parallel with updating the buddies near landmarks (step 512). Hence, the logical flow and operation described with respect to FIG. 5 is merely illustrative in nature, and in no way limiting on the broader principles of the invention.

Figure 6:
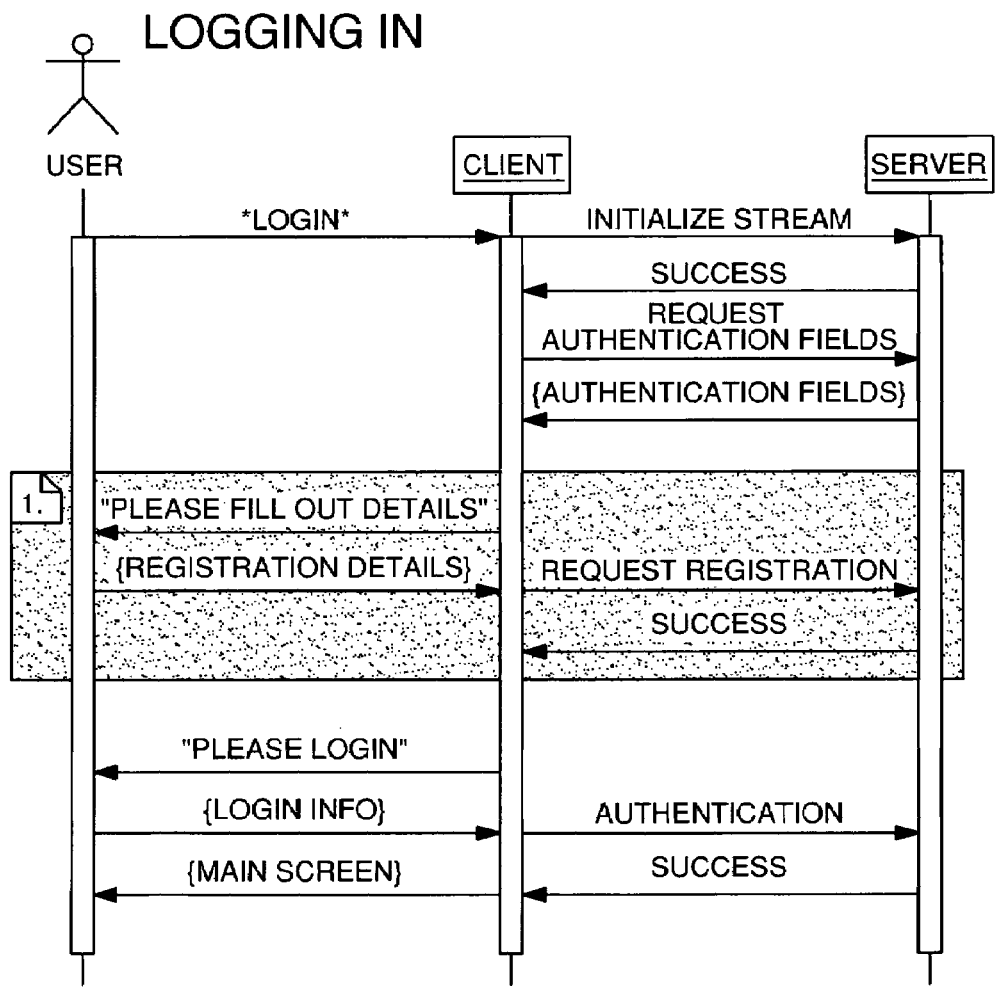
FIG. 6 is a graphical representation of an exemplary log-in protocol performed in accordance with certain embodiments of the invention.

FIG. 6 is an exemplary message protocol diagram illustrating the logging-in operation (step 502 of FIG. 5) performed in accordance with one embodiment of the invention. The arrows indicate the exchange of messages between the two logical entities connected by the arrows. The entities are a user (typically a person), the client (typically the client application of the mobile communications device) and the server (such as the server software process running on the server 204). It will be recognized that while a direct "message" exchange between these entities is shown in FIG. 6 (and others subsequent thereto), other entities or their proxies may be interposed. For example, an L2CAP or similar intermediary stack process may be present between the user interface (application layer) of the client device and the lower physical or network layers. Similarly, a WAP client may be used to interface with an intermediary WAP server before the messaging is passed to the distant (system) server 204. Various 3G RAN or IMS components may also be logically or physically interposed, such as for authentication, privacy, and other related functions, including without limitation the call session control functions (P-CSCF), (I-CSCF), or S-CSCF, or a WAP gateway or server.

The login procedure 600 is an initial step in getting the MCD user in logical connection with the server 204 or other network agents. The username and password are typically sent to the server 204 for authentication via a protected or encrypted protocol of the type well known in the art, or otherwise protected for privacy. The server 204 of the exemplary embodiment utilizes authentication procedures to protect against spoofing or similar surreptitious activities. For clients that have limited user input (such as mobile telephones with simple keyboards), the login username and password can be cached on the client device so as to minimize unnecessary or tedious data entry by the user.

The registration details including contact information about the user such as email address are used to create an account for that user on the server 204 (or another network agent). This step is typically performed only once, such as at account setup. It may also be performed when the MCD "roams" to another service provider's network for the first time.

Figure 7:
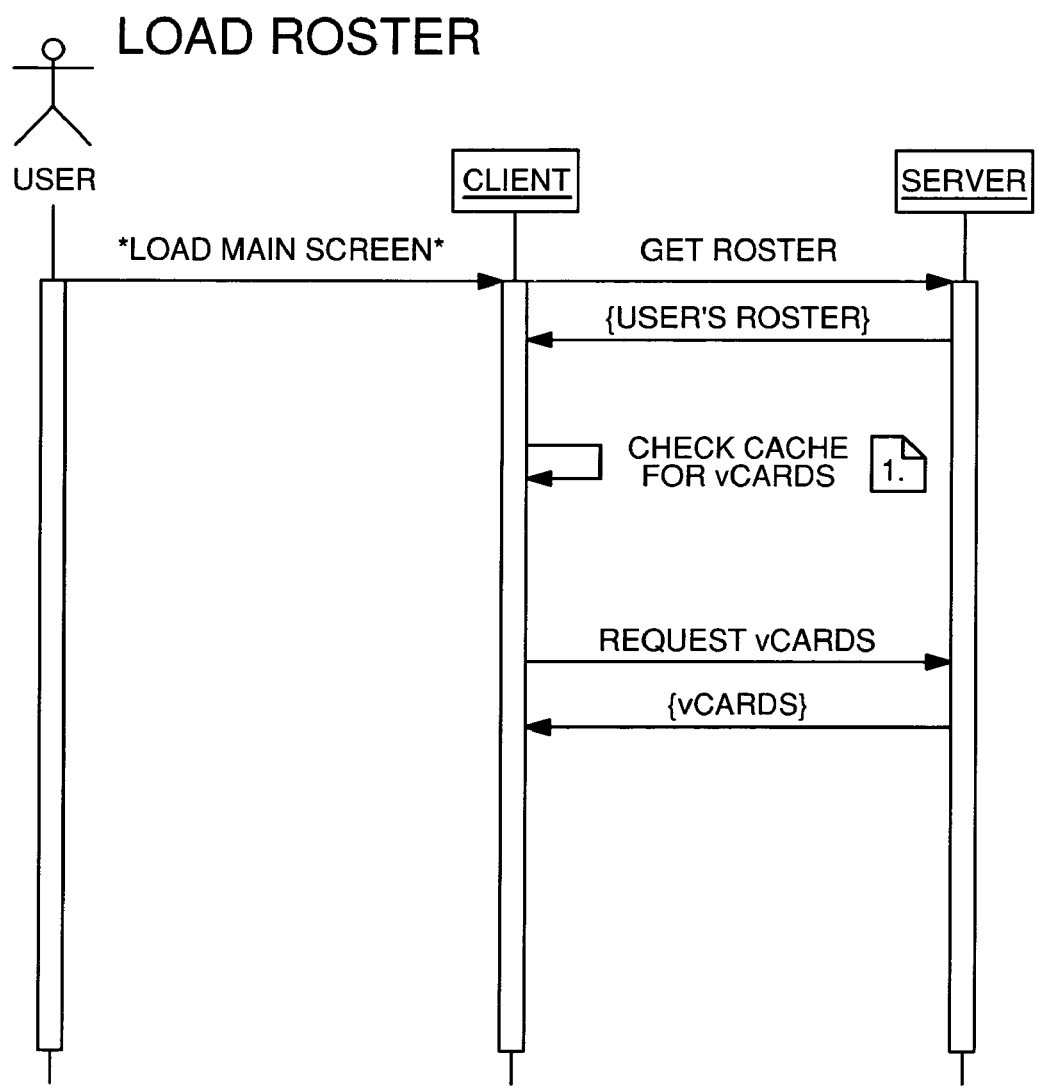
FIG. 7 is a graphical representation of an exemplary roster loading protocol performed in accordance with certain embodiments of the invention.

FIG. 7 is a message diagram illustrating the load roster operation (step 504) performed in accordance with one embodiment of the invention. The user roster is preferably a list of contacts that the user knows or has some other psychographic or other relationship with. Each contact in the roster is typically another user of the system, although this is not a requirement. For example, the contacts may be "out of network" users, or even users on an entirely different modality (e.g., previously paired Bluetooth users with whom the user interfaces directly when within range). The vCards are typically cached on the client as previously discussed, although this is not a requirement. This on-MCD caching allows for use of contact information off-line, minimizing network traffic, and faster client-user interaction (since the MCD does not have to "fetch" the information from a remote source). The vCards can generally be manually updated, as well as being automatically updated such as on a periodic or anecdotal basis.

For purposes of the exemplary embodiment described herein, a "contact" comprises a person or other entity, such as a business or organization. However, a contact need not be a human or aggregation of humans; it may also comprise a non-corporeal entity, such as a message server process, database, URL, etc. A "buddy" is like a contact, but is typically a person or entity the user knows well, or has a particular relationship with. In one embodiment, buddies are found in rosters only; therefore a roster comprises a list of contacts that the user knows well. Each contact in the roster is preferably a user of an MCD/client as well.

A vCard is a virtual "card" (also sometimes called "eCard", "virtual business card", etc.) that stores data about a given contact. This data may be in form of metadata, such as an XML representation or file. The metadata may also be made human-readable or perceivable if desired so as to facilitate ease of use. In one embodiment of the invention, the vCards are required to have at least a name and telephone number (or e-mail). The vCards for businesses are preferably required to have complete street addresses as well in order to increase their utility to the user. The vCards for landmarks or waypoints preferably include the geographic or coordinate information such as latitude and longitude or other coordinates, local points of interest or related locations, etc.

Figure 8:
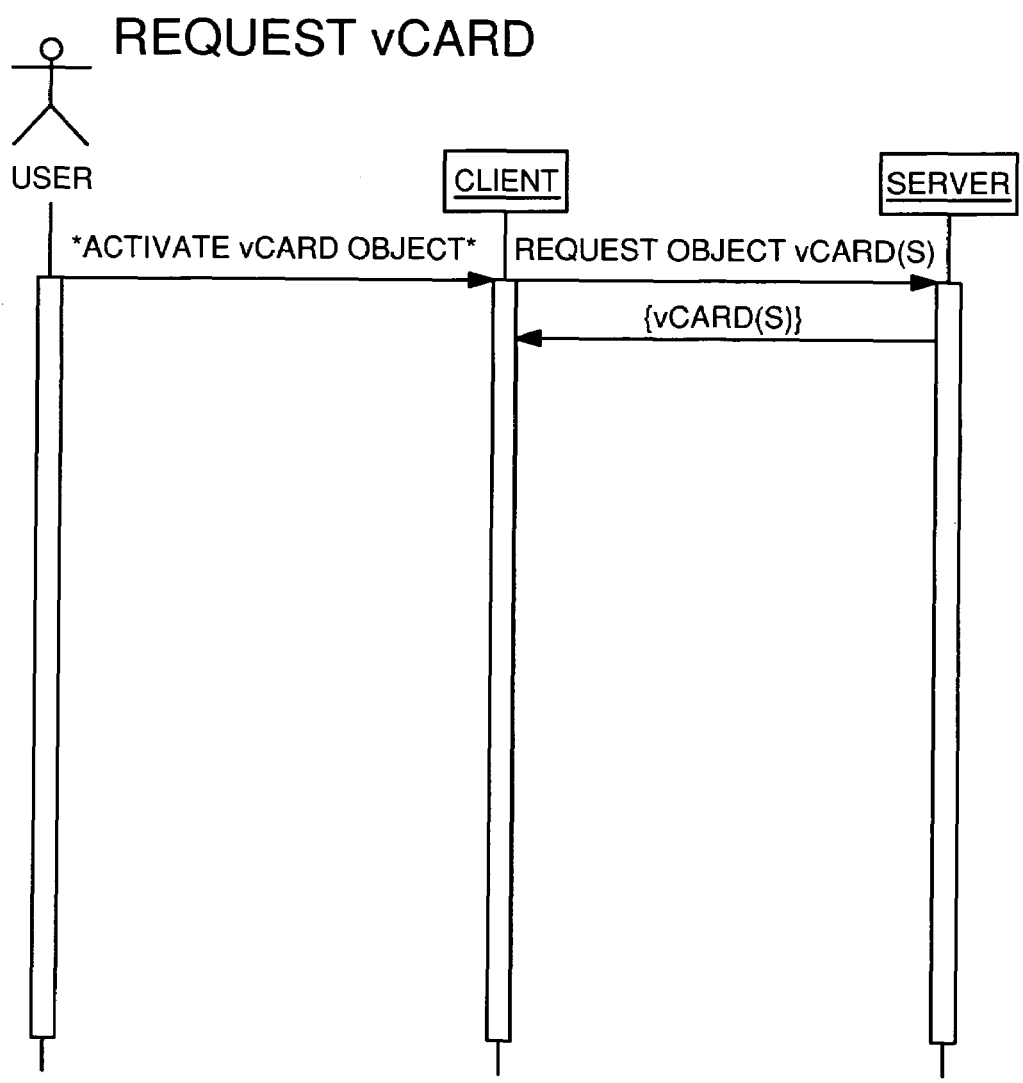
FIG. 8 is a graphical representation of an exemplary vCard request protocol performed in accordance with certain embodiments of the invention.

FIG. 8 is a message diagram illustrating the "request vCard" operation (step 506) performed in accordance with one embodiment of the invention. In one variant of the present invention, the objects and/or contacts in the system may have vCards associated with them. For objects (e.g., landmarks, waypoints, etc.), the vCards contain information about the object including images, street addresses, names and geographic coordinates, although this is not a requirement. The objects preferably have a unique means for identification (e.g., an ID filed, name, numerical sequence, etc.) associated with them, which is used as the query parameter for requesting the vCard. This information may also be contained in a relational database, so that the user/MCD (or its proxy) can query any one of a plurality of identification terms.

Furthermore, multiple cards may be requested and returned at the same time in one embodiment of the invention, such as where a global classifier or identifier is used (e.g., vCards for the user's family, all of the user's waypoints, the user's favorite landmarks, etc.).

Figure 9:
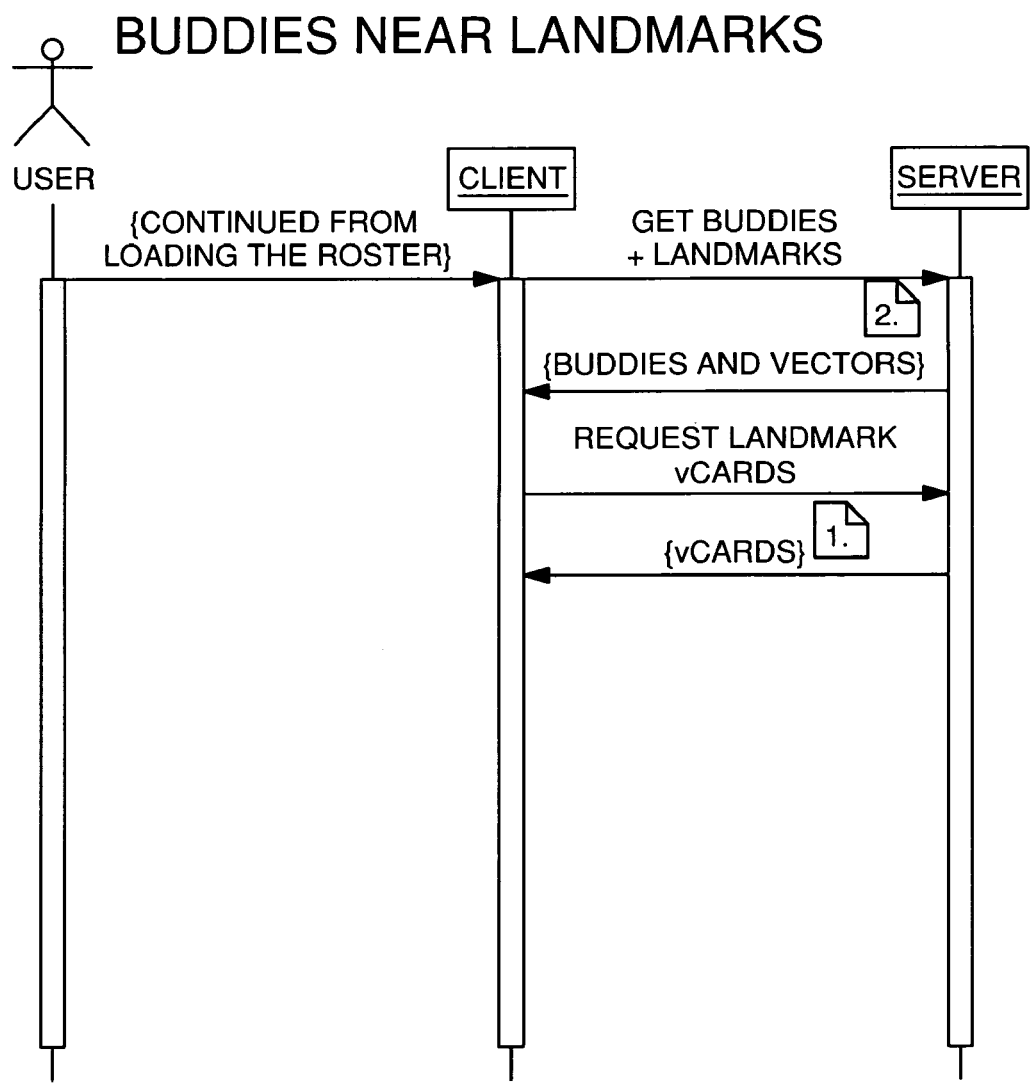
FIG. 9 is a graphical representation of an exemplary "buddy" location protocol performed in accordance with certain embodiments of the invention.

FIG. 9 is a message diagram illustrating the "buddies near landmark" operation (step 512 of FIG. 5) performed in accordance with one embodiment of the invention. This process queries and retrieves information on the location of the user's buddies in relation to landmarks that the user may be near at the time of the query (or even in an anticipatory or historical fashion, such that the user can get an idea of buddy location before actually being at the entered location, or after leaving the location). The information returned is, in this embodiment, relative to the user's position, although other embodiments can utilize referencing to another user or location. For example, User A can act as a proxy and invoke a query to find buddies near another family member (User B) that is not co-located with User A.

The exact location of the user(s) is not disclosed in the exemplary embodiment so as to preserve anonymity and privacy. Precision often can be cognitively demanding in the interface as well if reference landmarks are not known. Rather, the locations are relative (for example in angles/azimuths and distances) to landmarks or waypoints. Such relative location information is referred to herein as a relative vector. Similarly, the locations of the buddies themselves are also preferably provided in relative terms.

Figure 10:
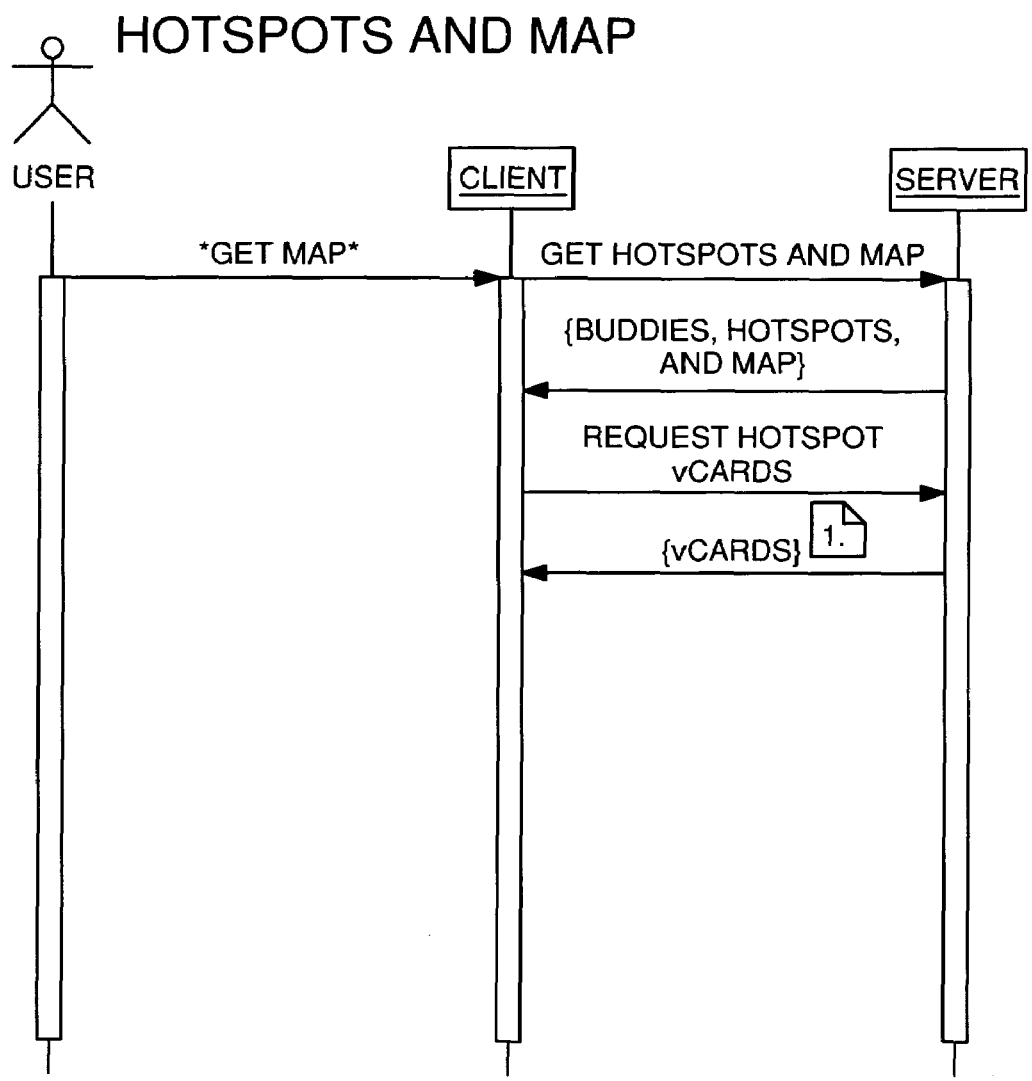
FIG. 10 is a graphical representation of an exemplary hotspot and mapping location protocol performed in accordance with certain embodiments of the invention.

FIG. 10 is a message diagram illustrating the "hotspots and map" operation (step 514) performed in accordance with one embodiment of the invention. This process 514 is used for querying and retrieving information on the exact location of the user's buddies and any nearby "hotspots" (e.g., points of particular interest to or frequented by the user, WiFi hotspots or portals, or other communications access points). The information returned by this process is used with a physical map or other display representation. In the exemplary embodiment, the server returns a URL or other such pointer for the map's image, as well as the geographic extent or boundaries of the mapped region. The "map" may be rendered in any convenient or useful format and is not necessarily constrained to a cartographic representation, but may be rendered in any fashion including for example mercator projection, polar projection/coordinates, etc. Additionally, the server function returns the exact position of visible buddies and hotspots which can then be plotted by the client application onto the map. Alternatively, the actual map data itself may be returned to the client in an alternative embodiment of the invention.

Hotspots, like landmarks, have their location information stored in vCards or similar data structures. The vCard includes the hotspot's name, address information, geographic information and a human readable description.

Figure 11:
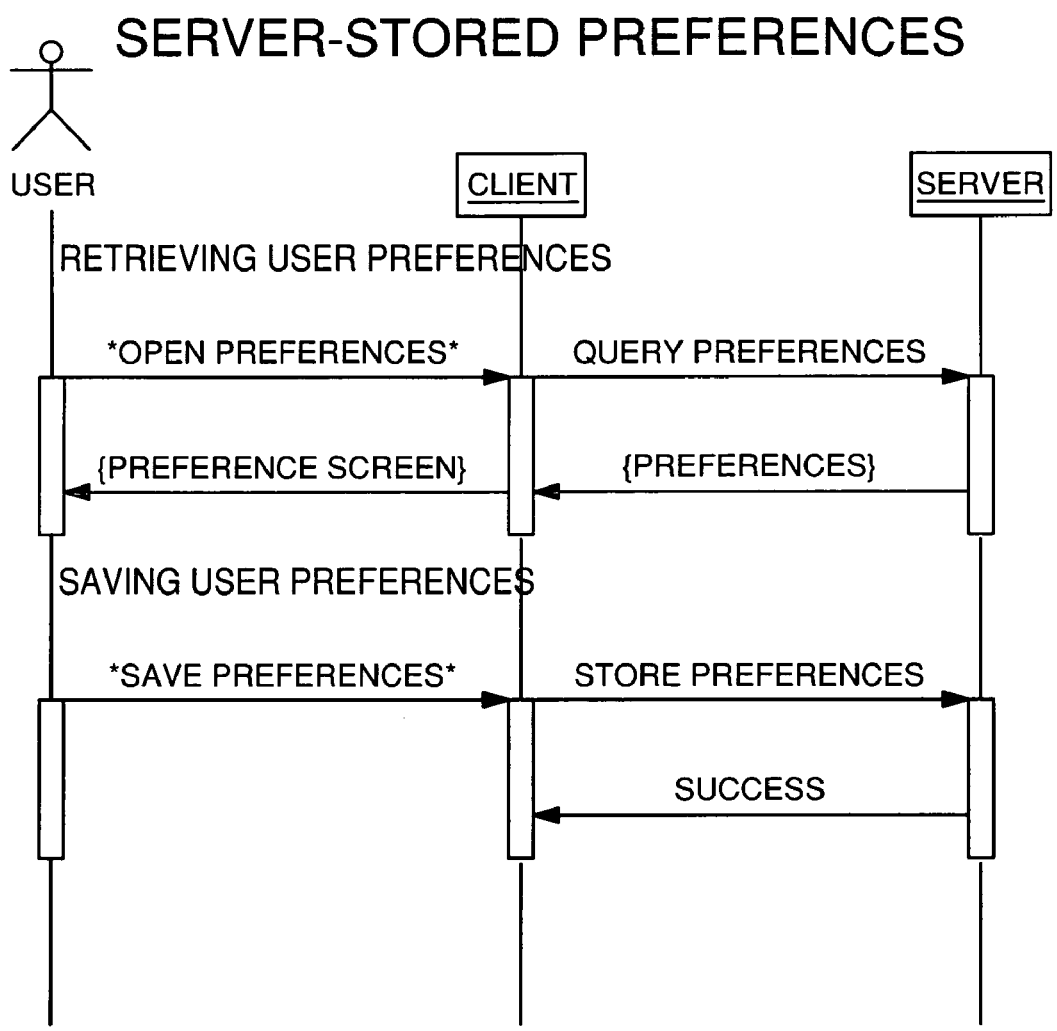
FIG. 11 is a graphical representation of an exemplary user preference storage and retrieval protocol performed in accordance with certain embodiments of the invention.

FIG. 11 is a message diagram illustrating the "server-stored preferences editing" operation (step 516 of FIG. 5) performed in accordance with one embodiment of the invention. This process 516 provides a method for storing Client preferences on the server or proxy device. Such storage can be used for backup purposes (in case the constant memory or other storage device of the MCD 100 is corrupted or purged), or so the information of the client device can be seamlessly migrated to another client device without loss of user data. That is, under one embodiment of the invention, a user can switch phones or MCDs and have the preferences transferred automatically by the network based on, e.g., the user's "user name" or other identification information. In this fashion, the user is capable of rapidly and seamlessly migrating platforms, while their user preference and other personalized information follows them from platform to platform (if desired). The preference information may comprise, e.g., information regarding the configuration of the client application, previous buddy, landmark, contact, or waypoint lists, user interface options (e.g., GUI or keyboard settings, speech recognition algorithm training files or settings), default searches, or stored favorite links.

Figure 12:
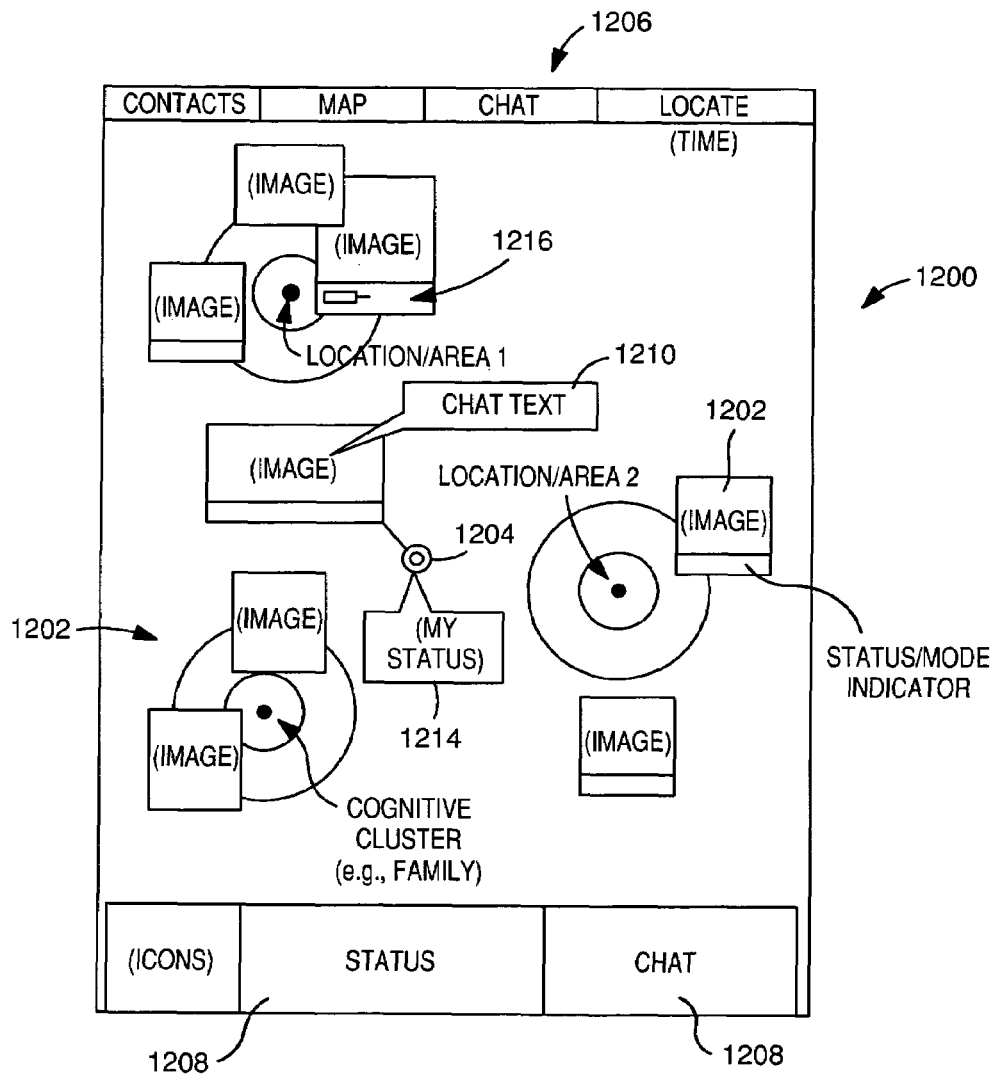
FIG. 12 is a graphical representation of one embodiment of the MCD display image according to the present invention.

FIG. 12 is an exemplary display graphic as rendered by one embodiment of the invention. As shown in FIG. 12, the display 1200 has a plurality of visual icons or elements 1202 generally surrounding the user's representation on the display, with categories being assigned by the server according to the location clusters previously described. The small (user) element 1204 is generally maintained at the center of the display, thereby underscoring the distinction between this embodiment of the invention and prior art geographic or mapping-based systems, wherein the user's location is displayed on a map at prescribed geographic coordinates. The user display element 1204 is also made interactive (i.e., selectable via input device) so that the user's status and other information can be changed if desired. Other functions (such as data services integration) can be accessed through such display functionality.

In the illustrated embodiment of FIG. 12, the display 1200 includes a plurality of menu options 1206, as well as various operating/display mode selections 1208. Chat message text 1210 and user status indications 1214 are also provided. Further, each icon or element 1202 can include an icon or other visual element 1216 (e.g., text) to indicate the status and/or primary communication mode for the entity represented by that element 1202.

FIG. 13 illustrates another exemplary display format useful with the present invention. In this embodiment, the contacts or cluster members are contemporaneously shown in tabular or other fashion. For example, in the embodiment of FIG. 13, a simple grid 1302 is generated with a contact or cluster shown or listed in each square of the grid. The user element is located in the center square 1304. The position of the display elements (e.g., text, icons, etc.) within each square of the grid 1302 indicates one or more attributes, such as those contacts with the most recent activity. Furthermore, variations in the font, coloration, etc. can be used to indicate status or availability.

The exemplary keypad 104 of the MCD 100 shown in FIG. 13 allows the user to select an individual square, and the up/down arrow functions (e.g., SFKs) allows the user to navigate the grid, and scroll between different contacts.

It will be appreciated, however, that in devices not having the requisite input functionality and GUI capability for the display of FIG. 13 (e.g., text-only devices), a more restricted embodiment can be employed, wherein the UI comprises a series of menus, or a card in a WAP-card deck, with each location cluster represented by a single display screen.

Similarly, multiple cluster types can be aggregated into the display, such that the user device effectively displays a "cluster of clusters" (e.g., showing the "family member" cluster, the "business associates" cluster, etc. all on the same display). In this fashion, the user can be apprised of the contact "density" associated with multiple clusters (or types of psychographic/geographic/cognitive themes) at once. This is useful from the perspective of allowing the user to see which mode of operation will produce the most results in terms of contacts; e.g., there may be few or no family members in proximity to their location, but many business associates.

In yet another embodiment of the invention, a "meta-agent" such as that detailed in co-pending U.S. patent application Ser. No. 11/026,421 filed Jan. 31, 2004 entitled "Method for interacting with automated information agents using conversational queries", previously incorporated herein by reference in its entirety, may be used to direct interaction with automated agents on text messaging systems. The MCD client application described herein can represent (and graphically render) the meta-agent for various types of interaction. Conversely, the meta-agent can use information passed by the MCD 100 automatically.

In the exemplary embodiments of the present invention, users can address the meta-agent directly if the meta-agent is represented in the MCD mobile display client. The meta-agent (and associated functionality) can advantageously be clustered with users according to context, even though it is not a physically-located human entity, thereby acting as another proximate "contact" for purposes of the present disclosure. This approach enables the clustering features of the present invention to be used in an automated manner to streamline interaction with the meta-agent (typically a computerized process).

For example, if the meta-agent "knows" (through meta-information or meta-data) that one of its client automated agent processes ("agents") can answer queries about Italian restaurants in the North End of Boston, the meta-agent (or its proxy agent) should appear in the "North End contacts" cluster as provided by the MCD client application, along with any human contacts (friends, family, etc.) in that area. The MCD client can pass the clustering location (here, North End of Boston) to the meta-agent with any user request.

Note that the presence of the meta-agent or proxy in a given cluster may be driven by any type of proximity, whether geographic, cognitive or otherwise. For example, in a cognitive application, the meta-agents for services that the user utilizes frequently could form the basis of a cluster; e.g., a "dining out" meta-agent contact, a "music download" meta-agent contact, etc.

Integrated Circuit Device—

An exemplary integrated circuit useful for implementing the various client-side and server-side processes of the invention is now described. In one embodiment, the integrated circuit comprises a System-on-Chip (SoC) device having a high level of integration, and includes a microprocessor-like CPU device (e.g., RISC, CISC, or alternatively a DSP core such as a VLIW or superscalar architecture) having, inter alia, a processor core, on-chip memory, DMA, and an external data interface.

It will be appreciated by one skilled in the art that the integrated circuit of the invention may contain any commonly available peripheral such as serial communications devices, parallel ports, timers, counters, high current drivers, analog to digital (A/D) converters, digital to analog converters (D/A), interrupt processors, LCD drivers, memories, wireless interfaces such as those complying with cellular, Bluetooth, IEEE-802.11, UWB, PAN/802.15, WiMAX/802.16, or other such standards, and other related peripherals, as well as one or more associated microcontrollers. Further, the integrated circuit may also include custom or application specific circuitry that is specifically developed to support specific applications (e.g., geo-positioning algorithms, contact/buddy list filtration, map generation, etc.). This may include, e.g., design via a user-customizable approach wherein one or more extension instructions and/or hardware are added to the design before logic synthesis and fabrication.

Available data or signal interfaces include, without limitation, IEEE-1394 (Firewire), USB, UARTs, other serial or parallel interfaces.

The processor and internal bus and memory architecture of the IC device is ideally adapted for high-speed data processing, at least sufficient to support the requisite client- and server-side tasks necessary to implement the present invention effectively in real time. This may be accomplished, e.g., through a single high-speed multifunction digital processor, an array of smaller (e.g., RISC) cores, dedicated processors (such as a dedicated DSP, CPU, and interface controller), etc. Myriad different IC architectures known to those of ordinary skill will be recognized provided the present disclosure.

It is noted that power consumption of devices such as that described herein can be significantly reduced due in part to a lower gate count resulting from better block and signal integration. Furthermore, the above-described design method provides the user with the option to optimize for low power. The system may also be run at a lower clock speed, thereby further reducing power consumption; the use of one or more custom instructions and/or interfaces allows performance targets to be met at lower clock speeds. Low power consumption may be a critical attribute for mobile systems such as the aforementioned MCDs 100.

Alternatively, the IC design can be optimized for speed irrespective or power consumption or die size, such as for server-side applications where space and/or power consumption are less critical. In this capacity, a reconfigurable compute fabric (RCF) or similar multi-core architecture adapted for very high speed processing can be employed as required.

The present invention also contemplates the use of "distributed" computing, wherein one or more constituent devices (which may even include other MCDs) can provide server-like functionality.

Business Methods and Products—

Services that may be provided in various embodiments of the invention may range widely, to include for example subscriber services that are provided to subscribers of a particular service provider, downloads for subscribers or other users that include pre-configured user preferences or location lists, and the provision of various types of media or services that are optimized for the user's particular MCD.

It will be appreciated that while various business models can be utilized consistent with the invention, a salient underlying advantage offered under all such models is the ability of the present invention to instigate increased use of the mobile communications network, thereby increasing user satisfaction and also service-provider revenue. Specifically, by more efficiently and affectively managing personal and contact information for users, and relating this to their in situ condition on a real-timer basis, the user is offered significantly greater opportunity to contact friend, family, business, etc. For example, if one knows at all times the location of their friends and family, and sees that one or more of the foregoing are proximate to them, they will often be more likely to contact them. Simply stated, one aspect of the present invention eliminates the "out of sight, out of mind" disability of prior art information management systems in the mobile environment.

Under one business model, fee-based or incentive subscriptions to these services are offered to network subscribers. The services provider, such as a telecommunications company, network access provider, or even third party, could then operate the system 200 so as to provide these services to the subscriber during use. Alternatively, a "per use" or prepaid model can be used, such as where the user can download the desired cluster or other information for a fee. This approach may be especially attractive to users who use these features only sporadically, thereby potentially not justifying a monthly or other subscription fee.

Varying levels of metadata might also comprise a basis for a business model or service differentiation. For example, richer or more complete metadata (including more comprehensive images, downloads, descriptive information, etc.) could be provided to premium users, whereas a more basic service level might only include very basic data necessary to make the service useful. The metadata may also comprise hyperlinks or other reference mechanisms which, if selected, allow the user to proceed to another URL that bears some logical relationship to the location, landmark, or business entity vCard they have requested or viewed.

The metadata may also comprise search terms that can be used as input to a search engine. For example, the metadata may have an XML character string which, when entered into a search engine such as Google or Yahoo!, generates alternate hits having similar characteristics to those of the location/landmark/waypoint of interest. This metadata can be automatically entered into the search engine using simple programming techniques, such as a graphic or iconic "shortcut" soft function key (SFK) or GUI region that the user simply selects to invoke the search. Alternatively, the metadata can be manually entered by the user via an input device (e.g., keypad, etc.), although this is more tedious.

The service provider could even be compensated on a "hits" or "views" basis; the more views or inclusions within a subscriber list a given commercial location or establishment gets, the more revenue generated for the service provider.

The server 204 can also be configured to receive profiling data from the MCD 100 (e.g., regarding its hardware and/or software capabilities) that allows the server or a proxy to configure the media provided to the MCD so as to be optimized for that platform. For example, the server/proxy would select the proper video encoding format, bit rate, file types, etc. that would be compatible with the MCD's microbrowser, applications, and so forth. This increases user satisfaction by providing substantially seamless integration, delivery, and playback of media on the user's MCD, without the user having to hunt for the appropriate codecs, media applications, or worse having media delivered that is functionally unplayable on the user's MCD.

Thus, methods and apparatus for organizing and presenting contact information in a mobile communication system have been described. Many other permutations of the foregoing system components and methods may also be used consistent with the present invention, as will be recognized by those of ordinary skill in the field.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I

©Copyright 2005 France Telecom. All rights reserved.

Appendix

Protocol Overview

1. Introduction 1.1 Overview

This document summarizes the communications protocols between FTRD Boston's server application and Motorola's *My Community* client application.

1.2 Jabber Note

The core communication protocol between applications is Jabber.

1.3 Terms/Components landmark

Refers to a geographically proximate area.

hotspot

Refers to a point of interest (ic restaurant) near a landmark.

Client

Refers to the *My Community* application that resides on the Motorola handset

Server

Refers to the set of applications that reside on the FTRD Boston server, specifically the *My Community* component packet A Jabber(XMPP) packet as described in the draft specifications.

As is common with other protocol specifications, the capitalized key words "MUST", "MUST NOT", "REQUIRED", "SHALL", "SHALL NOT", "SHOULD", "SHOULD NOT", "RECOMMENDED", "MAY", and "OPTIONAL" in this document an to be interpreted as described in RFC2112.

1.4 Copyright Note

As this protocol uses Jabber, many examples have been taken from official Jabber publications. These examples are not cited as is not required by their license.

2. Use Cases 2.1 Session Initialization

The client MUST first initialize the stream. On a successful connection, the client SHOULD request authentication fields iii order to determine what the server can receive. The client then MUST either send an authentication attempt or register with the server and subsequently authenticate with the server.

2.1.1 Stream Initialization Send:

```
<stream:stream to="mdo.ftrd.us" xmlns="jabber:client"
xmlns:stream="http://etherx.jabber.org/streams">
```

Connect successfully

Receive:

```
<?xml version='1.0'?> <stream:stream
    xmlns:stream='http://etherx.jabber.org/streams'
    id='...' xmlns='jabber:client' from='mdo.ftrd.us'>
```

2.1.2 Request Authentication Fields

Send:

```
<iq type='get' to='shakespeare.lit' id='auth1'> <query
xmlns='jabber:iq:auth'>   <username>bill</username>
</query> </iq>
```

Receive:

```
<iq type='result' id='auth1'> <query
    xmlns='jabber:iq:auth'>   <username/> <password/>
    <digest/>   <resource/>   </query> </iq>
```

2.1.3 Request Registration

If the client has not registered and before any other transactions can occur, the Client MUST register with the server using the iq:register packet Send:

```
<iq id='auth2' to='shakespeare.lit' type='set'>
    <query xmlns='jabber:ig:register'>
    <username>JID</username>
    <password>password</password>
    <resource>MyCommunity01</resource>   </query> </iq>
```

Receive:

```
<iq id='auth2' type='result'/
```

2.1.4 Authentication

The client MUST authenticate before making any transactions other than registration.

<hash/> is an SHA1 of a concatenation of the Session ID and password eg.: SHA1 (concat (sid, password)).

Send:

```
<iq type="set" id="auth3">
<query xmlns='jabber:iq:auth'>
   <username>JID</username>
      <hash>961bca239b4f0d109296lbac3dd1841f4b5142ef</hash>
   <resource>MyCommunity01</resource>
</query> </iq>
```

User authenticated successfully

Receive:

```
<iq type='result' id='auth3'/>
```

User authentication failure
On error, the server will send:

```
<iq id='auth3' type='error'>
<query xmlns='jabber:iq:auth'>
   <username>JID</username>
   resource>MyCommunity01</resource>
   <hash>961bca239b4f0d109296lbac3dd1841f4b5142ef</hash>
</query> <error code='401'>Unauthorized</error> </iq>
```

2.2 Server-stored User Preference.

The mycomm:prefs namespaces is described in prefs.dtd.

2.1 Storing user preferences

Send:

```
<iq type='set' id='...'>
<query xmlns='jabber:iq:private'>
<userprefs xmlns='mycomm:prefs'>
<application id='My Community' version='1.0'/>
<privacy>
<statusDisclosure value='allow'/>
<locationDisclosure value='disallow'/>
</privacy>
<applPreferences>
<view zoomLevel='1' maxBuddies='10'/>
<refresh location='60'/>
</applPreferences>
</userprefs>
</query> </iq>
```

Receive:

```
<iq type='result' />
```

2.2.2 Retrieving user preferences

Send:

```
<iq type='get' id='...'>
<query xmlns='jabber:iq:private'>
<userprefs xmlns='mycomm:prefs'/>
</query> </iq>
```

Receive:

```
<iq type='result' id='...'>
<query xmlns='jabber:iq:private'>
<userprefs xmlns='mycomm:prefs'>
<application id='My Community' version='1.0'/>
<privacy>
<statusDisclosure value='allow'/>
<locationDisclosuer value='disallow'/>
</privacy>
<applPreferences>
<view zoomLevel='1' maxBuddies='10'/>
<refresh location='60'/>
</applPreferences>
</userprefs>
</query> </iq>
```

2.3 Get full user buddy list to load in the phone-book

2.3.1 Get roster

Use the standard Jabber roster system for this. See Roster Management in the XMPP specs for more information.

The client SHOULD first get the roster from the server, then put together a query to get all the vCards of those buddies. Ideally, the buddies' vCards are cached on the client to save network traffic. They should be refreshed periodically or manually by the user Send:

```
<iq from='juliet@example.com/balcony' type='get'
id='roster_1'>
<query xmlns='jabber:iq:roster'/> </iq>
```

Receive:

```
<iq to='juliet@example.com/balcony' type='result'
id='roster_1'>
<query xmlns='jabber:iq:roster'>
<item jid='romeo@example.net' name='Romeo'
subscription='both'> <group>Friends</group> </item>
<item jid='mercutio@example.org' name='Mercutio'
subscription='from"> <group>Friends</group> </item>
<item jid='benvolio@example.org' name='Benvolio'
subscription='both'><group>Friends</group></item>
</query></iq>
```

2.3.2 Get vCards

The client specifies which users' or hotspots' vCards it desires and the server will send back a list of all known vCards that were specified.

Send:

```
<iq type='get' to='mycommunity' id=roster_2'>
    <query xmlns='mycomm:vcards'>
        <item jid='simona@example.net'/>
        <item jid='xavier@mdo.ftrd.us'/>
    </query>
</iq>
```

Receive:

```
<iq id='roster_2' from='mycommunity' type='result'>
  <query xmlns='mycomm:vcards'>
    >item jid='simona@example.net'>
      <vCard xmlns='vcard-temp'>
        <FN>Simona Ricaldone</FN>
        <N>
          <FAMILY>Ricaldone</FAMILY>
          <GIVEN>Simona</GIVEN>
        </N>
        <NICKNAME>Simo</NICKNAME>
<PHOTO><TYPE>image/png</TYPE><BINVAL>...</BINVAL>
</PHOTO>
        <TEL><VOICE/><HOME/><NUMBER>1234567</NUMBER>
        </TEL>
        <TEL><VOICE/><WORK/><NUMBER>901234</NUMBER>
        </TEL>
        <TEL><VOICE/><PREF/><CELL/><NUMBER>56789
        </NUMBER></TEL>
                                          <TEL><FA
                                          <ADR>
                                          <WORK/>
                        <EXTADD>AAA</EXTADD>
                           <STREET>BBB</STREET>
                      <LOCALITY>CCC</LOCALITY>
                           <REGION>DDD</REGION>
                             <PCODE>17031</PCODE>
                                            </ADR>
             <EMAIL><INTERNET/><PREF/><USERID>
                        simona.ricaldone@motorola
                             .com</USERID></EMAIL>
        <JABBERID>simonaR@mdo.ftrd.us</JABBERID>
                                          </vCard>
                                           </item>
                   <item jid='mercutio@example.org'>
                                          </vCard>
                                             ...
                                          </vCard>
                                           </item>
                                          </query>
                                              </iq>
```

To determine which communications modes the user prefers, there is a flag that can be used, <PREF/≦. It looks like this:

```
<TEL><VOICE/><HOME/><NUMBER>12345</NUMBER></TEL>
<TEL><VOICE/><PREF/><WORK/><NUMBER/></TEL>
<TEL><VOICE/><PREF/><CELL/><NUMBER/></TEL>
```

2.4 Get buddy list and landmark bused on user position

This uses the mycomm:vectors namespece described in vectors,dtd

Send:

```
<iq to='mycommunity' type='get'>
    <query xmlns='mycomm:vectors' zoomLevel='3'>
        <loc xmlns='mycomm:loc'>
            <gps>
                <lat>42373250</lat>
                <lon>-71120751</lon>
            </gps>
        </loc>
        <landmarks max='5'/>
        <buddies max='9'>
            <buddyVector jid='xavier@mdo.ftrd.us'/>
            <buddyVector jid='luna@mdo.ftrd.us'/>
            <buddyVector jid='sean@mdo.ftrd.us'/>
            <buddyVector jid='casey@mdo.ftrd.us'/>
            <buddyVector jid='justine@mdo.ftrd.us'/>
            <buddyVector jid='daniel@ndo.ftrd.us'/>
            <buddyVector jid='grant@mdo.ftrd.us'/>
            <buddyVector jid='sophie@mdo.ftrd.us'/>
        </buddies>
    </query>
</iq>
```

Receive:

```
<iq from='mycommunity' type='result'>
  <query xmlns='mycomm:vectors' scale='300000'>
    <landmarks>
      <landmarkVector jid='...' numBuddiesInLand='3'
      description='...'>
        <position relativeTo='user' distance='...' bearing='...'/>
      </landmarkVector>
      <landmarkVector jid='...' numBuddiesInLand='3'
description='...'>
        <position relativeTo='user' distance='...' bearing='...'/>
      </landmarkVector>
    </landmarks>
    <buddies>
      <buddyVector jid='userid'>
        <position relativeTo='landmark' distance='...' bearing='...'/>
        <inLandmark jid='...'/>
        <x xmlns='mycomm:status'>
          <user-defined>meet me</user-defined>
          <system-defined>...</system-defined>
          <tagline>coffee</tagline>
        </x>
      </buddyVector>
      <buddyVector jid='...'>
      ...
      </buddyVector>
    </buddies>
  </query>
</iq>
```

2.5 Presence and location from user

This uses the mycomm:status and mycomm:loc namespaces described an status.dtd and loc.dtd respectively. See System-defined status messages for a complete list of possible values for the system-defined element.

Presence must be sent in two packets: the presence needs to be broadcast, while the exact location of the user needs to only go to the server. This is accomplished by sending two presence packets: one general and one server-directed.

2.5.1 General presence

Send

```
<presence>
    <show>chat</show>
    <status>up for a cofree</status>
    <x xmlns='mycomm:status'>
        <user-defined>meet me</user-defined>
        <system-defined>...</system-defined>
        <tagline>...</tagline>
    </x>
</presence>
```

Each buddy on the user's buddy list will receive the following presence message (with their JID in the 'to' field):

Receive:

```
<presence from> 'simona@mdo.ftrd.us/MyCommunity'
to='xavier@mdo.ftrd.us'>
<show>chat</show> <status>up for a coffee</status>
<x xmlns='mycomm:status'>
<user-defined>meet me</user-defined>
<system-defined></system-defined>
<tagline></tagline></x></presence>
```

2.5.2 Server-specific presence

This contains more private information, namely the user's exact location, and should only be sent to "mycommunity"- the My Community agent, Send

```
<presence to='mycommunity'>
<show>chat</show>
<status>up for a coffee</status>
<x xmlns='mycomm:status'>
<user-defined>meet me</user-defined>
<system defined></system-defined>
<tagline></tagline>
<loc xmlns='mycomm:loc'>
<gps> <lat>42366225</lat><lon>-71079599</lon> </gps>
</loc></x></presence>
```

The server receives that presence information and updates the user's entry in the location database.

2.6 Instant Messaging

Standard Jabber Instant-messaging protocols will be used. The body should have XHTML parts as well as plum text parts. In the XHTML part, when talking about hotspots and landmarks, the hotspot and landmark URLs should be used.

Send

```
<message to='JIDReceiver@mdo.ftrd.us/MyCommunity01'>
<body>_</body></message>
```

Receive:

```
<message to='JIDSender@mdo.ftrd.us/MyCommunity' type=' '
from='JIDReceiver@mdo.ftrd.us/MyCommunity01'>
```

-continued

```
<body>Hi we could meet a Boca Grande</body>
<html xmlns='http://jabber.org/protocol/xhtml-im'>
<body>Hi we could meet at <a
href='hotspot:CambridMABocaGrandec928c59059b@locations.ftr.
us'>Boca Grande</a>
</body>
</html>
<subject/>
<thread/>
</message>
```

2.7 Hotspots +exact buddy position

This uses the mycomm:map namspace described in map.dtd

Send

```
<iq type='get' to='mycommunity' id='fool'>
<query xmlns='mycomm:map' zoomLevel='3'>
<loc xmlns='mycomm:loc'>
<gps>
<lat>42361685</lat> <lon>-71077315</lon> </gps></loc>
<phoneAtts> <screen height='230' width='240' /></phoneAtts>
<hotspots
selected='CambridMABocaGrandec928c59059b@hotspots.mdo.ftrd.
us' maxHotspots='3' />
<buddies> <buddy jid='xavier@mdo.ftrd.us'/>
<buddy jid='soldo@mdo.ftrd.us'/>
<buddy jid='luna@mdo.ftrd.us'/>
</buddies>
</query>
</iq>
```

Receive:

```
<iq from='mycommunity' id='fool' to='...' type='result'>
<query scaleLon='89800' xmlns='mycomm:map'
scaleLat='290700'>
<hotspots>
<hotspot name='Boca Grande' dist='152'
id='CambridMABocaGrandec928c59059b@hotspots.mdo.ftrd.us'>
<loc xmlns='mycomm:loc'>
<gps><lat>42366584</lat> <lon>-71077810</lon></gps></loc>
</hotspot>
<hotspot name='Sindibad Restaurant' dist='144'
id='CambridMASindibadRes8e582362a9@hotspots.mdo.ftrd.us'
<loc xmlns='mycomm:loc'>
<gps> <lat>42366386</lat> <lon>-71077858</lon></gps></loc>
</hotspot>
<hotspot name='The Helmand' dist='152'
id='CambridMATheHelmand6418bdb5335@hotspots.mdo.ftrd.us'>
<loc xmlns='mycomm:loc'>
<gps> <lat>42366584</lat> <lon>-71077810</lon> </gps></loc>
</hotspot>
</hotspots>
<x xmlns='jabber:x:oob'>
<desc>Map near user</desc>
<url>http://tiger.census.gov/cgi
bin/mapgen?wid=0.2907&iwd=240&lat=42.366225&ht=
0.0898&lon=-71.079599&iht=230</url></x>
<buddies>
<buddy jid='xavier@mdo.ftrd.us'> <loc xmlns='mycomm:loc'>
<gps> <lat>2366225</lat><lon>-71079599</lon></gps></loc>
</buddy>
<buddy jid='soldo@mdo.ftrd.us'> <loc xmlns='mycomm:loc'>
<gps> <lat>42374367</lat> <lon>-71120239</lon>
</gps></loc></buddy>
<buddy jid='luna@mdo.ftrd.us'> <loc xmlns='mycomm:loc'>
<gps> <lat>42351124</lat> <lon>-71056274</lon>
</gps></loc></buddy>
</buddies> </querry> </iq>
```

2.8 Get vCard of a user or hotspot vCard

Send

```
<iq type='get' to='boston@mycommunity/xavier@mdo.ftrd.us'
id='...'>          <vCard xmlns='vcard-temp'/> </iq>
```

To receive a cached copy of the vCard. sec get vCards

Receive:

```
<iq id='...' to='...' type='result'
from='boston@mycommunity/xavier@mdo.ftrd.us'> <vCard
xmlns='vcard-temp'>         ...       </vCard> </iq>
```

The key here is the 'to' value, which uses a virtual JID namespace hotspot.ftrd.us to specify which things are hotspots.

3 Managing Error Conditions
  Error 4 Namespaces and URLs 4.1 Virtual Hotspot JIDs namespaces

```
location@mycomunity/hotspotid@hotspots.example.com
```

The username part of the JID specifies the location (say, Boston or Italy) and the resource part of the JID specifies the hotspot ID. All parts must conform to the specs for JIDs so they can transmit freely about the system.

4.2 hotspot and landmark addresses and URLs

The format for the hotspot and landmark address is as follows:

```
id@host
```

Where id is the hotspot or landmark ID (eg: "CambridMASiamGarden65705c5009e") and host is the hostname.

For this the following hostnames art used:

Landmarks
  landmarks.mdo.ftrd.us
Hotspots
  hotspots.mdo.ftrd.us 4.2.1 Address examples a hotspot

```
CambridMASiamGarden65705c5009e@hotspots.mdo.ftrd.us
``` a landmark

```
CambridMAGalleriaMal9afc75ace3@landmarks.mdo.ftrd.us
```

4.22 URLs

The format for the hotspot and landmark URL is as follows:

```
type:address
``` valid values for type:
  hotspot
  landmark
  And address is a hotspot or landmark address as described above.

4.2.3 URL examples a hotspot

```
hotspot:CambridMASiamGarden65705c5009e@hotspots.mdo.ftrd.us
``` a landmark

```
landmark:CambridMAGalleriaMal9afc75ace3@landmarks.mdo.ftrd.us
```

The URLs are used in the body of the instant messaging packets when talking about hotspots and Landmarks 5 System-defined status messages busy in chat
  The user is busy in a chat with another user and cannot receive incoming chat messages. The regular mode should be "dnd" and the regular message be something to the effect of "Busy in a chat with another user. This user's client can only chat with one user at a time."

What is claimed is:

1. In a mobile communications network, said network including an information server and a mobile communications device coupled to said server via at least a wireless link, a method of operating comprising:
    transmitting a message including location information from said mobile communications device to said server via said at least wireless link;
    transmitting a list of contacts from said mobile communication device to said server via said at least wireless link;
    matching said contacts with said location information using data maintained for other communications devices to generate a list of proximate users, said act of matching comprising:
      determining at least one coordinate for each contact in said list of contacts, said at least one coordinate selected from the group consisting of: (i) longitude-latitude, (ii) GPS coordinates, and (iii) UTM coordinates;
      computing a distance from a current location for said mobile communications device derived from said location information to said at least one coordinate; and
      removing contacts having a distance that that does not meet one or more screening criteria;
    transmitting said list of proximate users to said mobile communications device; and
    displaying at least a portion of said list of proximate users on said mobile communications device.

2. The method as set forth in claim 1, wherein said mobile communication device comprises a cellular telephone, and said at least wireless link comprises a cellular air interface selected from the group consisting of: (i) CDMA; (ii) GSM, and (iii) UMTS.

3. The method as set forth in claim 1, further comprising:
obtaining a set of landmarks from a landmark location database, said set of landmarks being within a boundary distance of said current location;
assigning contacts that have not been removed via said act of removing to at least one cluster name, said at least one cluster name corresponding to a landmark obtained from said set of landmarks.

4. The method as set forth in claim 3, further comprising displaying said set of landmarks along with said list of proximate users on said mobile communications device.

5. The method as set forth in claim 1, wherein said act of computing also comprises determining a true proximity by including a weighting factor for obstacles located between said current location and said at least one coordinate.

6. The method as set forth in claim 1, wherein said location information is derived at least in part from participation of said mobile device in an ad hoc wireless network.

7. The method as set forth in claim 1, wherein said contacts are displayed in at least one cluster, wherein the configuration of said at least one cluster on a display is based at least in part on the number of contacts present in that at least one cluster.

8. The method as set forth in claim 7, wherein said at least one cluster comprises a plurality of clusters displayed in a grid format.

9. The method as set forth in claim 7, wherein only cluster information is displayed for each contact, and specific location information for said contacts is maintained undisclosed.

10. The method as set forth in claim 1, wherein said location information comprises information relating to the cognitive proximity of one or more contacts to a user of said mobile communications device.

11. A mobile communications device for communicating with a network, said mobile communications device having an input device and a display device, said mobile communications device comprising:
a microprocessor adapted to run client software;
client software configured to:
transmit a list of contacts from said mobile communications device to a server;
receive a list of proximate users from said server; and
display said list of proximate users on said mobile communications device; and
position location apparatus in data communication with said microprocessor and adapted to determine the location of the mobile communications device;
wherein a distance between said mobile communications device and one of said contacts is calculated by weighting any distance across water more heavily than any distance across land.

12. The mobile communications device as set forth in claim 11, wherein said list of proximate users comprises a list of users who are located within a prescribed distance from said mobile communications device.

13. The mobile communications device as set forth in claim 11, wherein said client software is further adapted to transmit the location of said mobile communication device to a server via a wireless link, said wireless link comprising a cellular air interface selected from the group consisting of: (i) CDMA; (ii) GSM, and (iii) UMTS.

14. The mobile communications device as set forth in claim 11, wherein said proximate users are grouped into clusters based on their proximity to one or more landmarks.

15. The mobile communications device as set forth in claim 14, wherein said clusters are displayed in a grid format.

16. The mobile communications device as set forth in claim 14, wherein said clusters are displayed over a geographical map received from said server.

17. A server for use in a mobile communications network, said mobile communications network providing communications services to a plurality of mobile communications devices, said server comprising:
a microprocessor configured for executing software instructions;
server software, running on said microprocessor, said server software comprising at least one software module adapted to:
receive a location identifier message, including a current location, from a mobile communications device from said plurality of mobile communication devices;
receive a list of contacts from said mobile communication device;
match said contacts with said current location using a location database maintained for other mobile communications devices to generate a list of proximate users; and
transmit said list of proximate users to said mobile communications device;
determine the coordinates for each contact in said list of contacts;
compute a distance from said current location to each of said coordinates; and
remove those contacts having a distance that is greater than a threshold distance.

18. The server as set forth in claim 17, wherein said server software is further adapted to:
determine a set of landmarks from a landmark location database within a boundary distance said current location; and
assign contacts that have not been removed to one or more clusters that correspond to a landmark within said set of landmarks.

19. The server as set forth in claim 17, wherein said server software is further adapted to determine a true proximity by including a weighting factor for obstacles located between said current location and said coordinates.

20. The server as set forth in claim 19, wherein one of said obstacles comprises a body of water, and the distance across said body of water is given greater weight than a distance across land.

21. The server as set forth in claim 17, wherein said server software is further configured to receive user preference information from a plurality of said mobile communications device, and store said user preference information on a per-user or per-device basis.

22. The server as set forth in claim 17, wherein said server software is further configured to retrieve information relating to a geographical area proximate to a mobile communications device requesting a buddy list, and transmit said information to said requesting mobile communications device.

23. In a mobile communications network, said network including an information server and a mobile communications device coupled to said server via a wireless link, a method of operating comprising:

receiving a message at said server via said wireless link, said message including location information from said mobile communications device;

receiving a plurality of contacts from said mobile communication device at said server via said wireless link;

matching said contacts with said proximity-related information using data maintained for other communications devices to generate a list of proximate users, said matching including:

determining at least one coordinate for each contact in said plurality of contacts, said at least one coordinate selected from the group consisting of:

(i) longitude-latitude, (ii) GPS coordinates, and (iii) UTM coordinates;

computing a distance from a current location for said mobile communications device obtained based on said location information, to said at least one coordinate;

removing contacts having a distance that that does not meet one or more screening criteria; and transmitting said list of proximate users to said mobile communications device for display of at least a portion thereof on said mobile communications device.

24. The method as set forth in claim 23, further comprising:

obtaining a set of landmarks from a landmark location database, said set of landmarks being within a boundary distance of said current location;

assigning contacts that have not been removed to at least one cluster name, said at least one cluster name corresponding to a landmark obtained from said set of landmarks.

25. The method as set forth in claim 24, further comprising providing data to said mobile communications device enabling display of said set of landmarks along with said list of proximate users on said mobile communications device.

26. The method as set forth in claim 23, wherein said act of computing also comprises determining a true proximity by including a weighting factor for obstacles located between said current location and said at least one coordinate.

27. The method as set forth in claim 23, wherein said location information is derived at least in part from participation of said mobile device in an ad hoc wireless network.

28. The method as set forth in claim 23, wherein said location information comprises information relating to the cognitive proximity of one or more contacts to a user of said mobile communications device.

* * * * *

UNITED STATES PATENT AND TRADEMARK OFFICE
CERTIFICATE OF CORRECTION

PATENT NO. : 7,620,404 B2  Page 1 of 1
APPLICATION NO. : 11/317473
DATED : November 17, 2009
INVENTOR(S) : Pascal Chesnais, Patrick Sean Wheeler and Stephen Pomeroy It is certified that error appears in the above-identified patent and that said Letters Patent is hereby corrected as shown below:

Title page, item (76)   Inventors: Pascal Chesnais, 152 New Bridge Rd., Sudbury, MA (US) 01776; Sean Wheeler, 26 Harley St., Apt. 1, Boston, MA (US) 02124; Steven Pomeroy, 41 Edge Hill Rd., Chestnut Hill, MA (US) 02467

SHOULD READ:

-- (76)   Inventors: Pascal Chesnais, 152 New Bridge Rd., Sudbury, MA (US) 01776; Patrick Sean Wheeler, 26 Harley St., Apt. 1, Boston, MA (US) 02124; Stephen Pomeroy, 41 Edge Hill Rd., Chestnut Hill, MA (US) 02467 --

Signed and Sealed this

Fourteenth Day of September, 2010

David J. Kappos
*Director of the United States Patent and Trademark Office*